United States Patent
Igarashi et al.

(10) Patent No.: US 9,902,876 B2
(45) Date of Patent: Feb. 27, 2018

(54) PAINT FILM PROTECTION SHEET

(71) Applicants: NITTO DENKO CORPORATION, Osaka (JP); KANSAI PAINT CO., LTD., Hyogo (JP)

(72) Inventors: Takeshi Igarashi, Osaka (JP); Toshitaka Suzuki, Osaka (JP); Nao Wakayama, Osaka (JP); Yoshikuni Hirano, Kanagawa (JP)

(73) Assignees: NITTO DENKO CORPORATION, Osaka (JP); KANSAI PAINT CO., LTD., Hyogo (JP)

( * ) Notice: Subject to any disclaimer, the term of this patent is extended or adjusted under 35 U.S.C. 154(b) by 296 days.

(21) Appl. No.: 13/939,457

(22) Filed: Jul. 11, 2013

(65) Prior Publication Data

US 2014/0023859 A1 Jan. 23, 2014

(30) Foreign Application Priority Data

Jul. 18, 2012 (JP) .................................. 2012-159195

(51) Int. Cl.
*C09J 7/02* (2006.01)
*C09J 123/22* (2006.01)
*C08L 23/12* (2006.01)

(52) U.S. Cl.
CPC ............. *C09J 7/0207* (2013.01); *C08L 23/12* (2013.01); *C09J 7/0214* (2013.01); *C09J 123/22* (2013.01);

(Continued)

(58) Field of Classification Search
CPC .... C09J 7/0246; C09J 7/0296; C09J 2433/00; C09J 7/02; B32B 7/12; B32B 27/08; G09F 3/10

(Continued)

(56) References Cited

U.S. PATENT DOCUMENTS 5,601,917 A    2/1997  Matsui et al.
5,618,883 A    4/1997  Plamthottam et al.

(Continued)

FOREIGN PATENT DOCUMENTS

EP    0 839 886 A2    5/1998
EP    0 955 346 A1    11/1999

(Continued)

OTHER PUBLICATIONS

U.S. Appl. No. 13/942,923 to Takeshi Igarashi et. al., filed Jul. 16, 2013.

(Continued)

*Primary Examiner* — Samir Shah
(74) *Attorney, Agent, or Firm* — Greenblum & Bernstein, P.L.C.

(57) ABSTRACT

The present invention provides a paint film protection sheet comprising a support substrate and a PSA layer placed on the support substrate. The PSA constituting the PSA layer comprises a non-crosslinked rubber-based polymer as a base polymer, a tackifier resin ($T_H$) having a softening point of 120° C. or above, and a tackifier resin ($T_L$) having a softening point below 120° C. The mass ratio ($T_L/T_H$) of the tackifier resin ($T_L$) content relative to the tackifier resin ($T_H$) content has a value of 1.0 or larger and 30 or less.

17 Claims, 1 Drawing Sheet

(52) U.S. Cl.
CPC ...... *C09J 2203/306* (2013.01); *Y10T 428/265* (2015.01); *Y10T 428/2852* (2015.01)

(58) Field of Classification Search
USPC .................................. 428/40.1, 343
See application file for complete search history.

(56) References Cited

U.S. PATENT DOCUMENTS

| | | | |
|---|---|---|---|
| 5,747,132 | A | 5/1998 | Matsui et al. |
| 5,882,775 | A | 3/1999 | Matsui et al. |
| 5,990,230 | A * | 11/1999 | Muramatsu et al. ......... 524/590 |
| 2001/0020515 | A1 | 9/2001 | Shibata et al. |
| 2001/0021451 | A1* | 9/2001 | Tokunaga et al. ............ 428/343 |
| 2004/0253464 | A1 | 12/2004 | Krawinkel |
| 2005/0054779 | A1* | 3/2005 | Zhou ............................ 525/240 |
| 2005/0209380 | A1 | 9/2005 | Wada et al. |
| 2006/0177654 | A1* | 8/2006 | Shoshi .......................... 428/354 |
| 2008/0020203 | A1* | 1/2008 | Tabata .......................... 428/343 |
| 2008/0292902 | A1* | 11/2008 | Reid ............................. 428/626 |
| 2010/0099318 | A1 | 4/2010 | Suzuki et al. |
| 2011/0020637 | A1* | 1/2011 | Ikishima et al. .............. 428/336 |
| 2011/0160039 | A1* | 6/2011 | Himeno et al. .................. 502/4 |
| 2012/0219796 | A1 | 8/2012 | Igarashi et al. |
| 2014/0008821 | A1* | 1/2014 | Toyoda et al. ................ 257/792 |

FOREIGN PATENT DOCUMENTS

| | | |
|---|---|---|
| EP | 1 580 245 A1 | 9/2005 |
| EP | 2 177 584 A1 | 4/2010 |
| EP | 2172529 A1 | 4/2010 |
| EP | 2 330 169 A1 | 6/2011 |
| JP | 9-3420 A | 1/1997 |
| JP | H09157598 A | 6/1997 |
| JP | H1025455 A | 1/1998 |
| JP | 10-140113 A | 5/1998 |
| JP | 2832565 B2 | 12/1998 |
| JP | 2001019926 A | 1/2001 |
| JP | 2005263917 A | 9/2005 |
| JP | 2000186257 A | 7/2007 |
| JP | 2008248115 A | 10/2008 |
| JP | 2010090185 A | 4/2010 |
| JP | 2010095610 A | 4/2010 |
| JP | 2011068713 A | 4/2011 |
| WO | 03/018702 A1 | 3/2003 |
| WO | WO2007353592 * | 3/2007 |
| WO | 2011/046064 A1 | 4/2011 |

OTHER PUBLICATIONS

U.S. Appl. No. 13/938,766 to Takeshi Igarashi et. al., filed Jul. 10, 2013.
U.S. Appl. No. 13/938,669 to Takeshi Igarashi et. al., filed Jul. 10, 2013.
Extended European Search Report issued with respect to European Application No. 13199040.6, dated Nov. 20, 2013.
Extended European Search Report issued with respect to European Application No. 13177040.6, dated Nov. 20, 2013.
Cain, "UV-Curable Hot Melt PSAs Based on Styrenic Block Copolymers" printed from www.pstc.org/files/public/TECH33Papers/2010CainCynthia.pdf on Jun. 24, 2015.
"Composition and Technical Description of Hot Melt Pressure Sensitive Adhesives" printed from www.gluemachinery.com/composition-technical-description-hot-melt-pressure-sensitive-adhesives/ on Jun. 24, 2015.
Office Action issued in Chinese Counterpart Application No. 201310303618.0, dated Jun. 12, 2016, along with an English translation thereof.
Japanese Office Action issued with respect to application No. JP2012-159195, dated Mar. 3, 2016.

* cited by examiner

[Fig. 1]
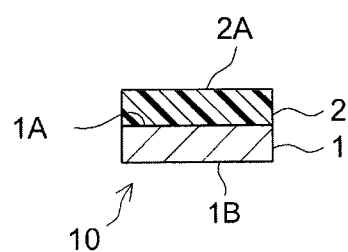
[Fig. 2]
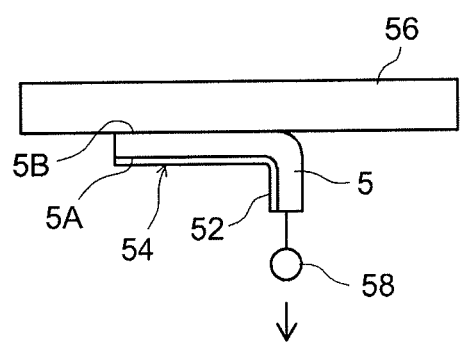

PAINT FILM PROTECTION SHEET

CROSS-REFERENCE

The present application claims priority based on Japanese Patent Application No. 2012-159195 filed on Jul. 18, 2012, and the entire contents thereof are incorporated herein by reference.

BACKGROUND OF THE INVENTION

1. Field of the Invention

The present invention relates to a paint film protection sheet for protecting a paint film from damages such as scratches, dirt deposits, and so on.

2. Description of the Related Art

During transporting, storing, aging or constructing an article having paint film (e.g., painted automobiles and their components or metal plates such as a steel plate and their molding, or the like) as a known means to prevent their surfaces of paint film from receiving damages etc., protection sheets are adhered to the paint film. A paint film protection sheet used for such a purpose is generally constructed to comprise a pressure-sensitive adhesive (PSA) layer on one face of a resin substrate sheet (support substrate) so that it can serve the protective purpose when adhered via the PSA layer to a paint film as an article to be protected. For example, for constituting a PSA layer in a paint film protection sheet for automobile use of a polyisobutylene-based PSA is known (Japanese Patent No. 2832565). Japanese Patent Application Publication No. H9-3420 discloses a paint film protection sheet that comprises a support substrate provided with a rubber-based PSA layer containing a highly polar inducer.

SUMMARY OF THE INVENTION

In general, paint film protection sheet is temporarily adhered to a paint film while the paint film needs to be protected (e.g., during the process or transport, etc., is ongoing). Subsequently, after use as a protective means, the protection sheet is removed (peeled away) from the paint film. For a paint film protection sheet used in such an embodiment, it is necessary to have properties (non-contaminating properties) that allow its removal without leaving residues from the paint film protection sheet on the paint film after use as a protective means (i.e., without contaminating the paint film with residues from the paint film protection sheet).

It is beneficial to increase the ability (initial adhesiveness) to produce sufficiently tight adhesion quickly upon application to a paint film while maintaining such non-contaminating properties at a sound level for practical use. This is because, if the initial adhesiveness of the paint film protection sheet is insufficient, the efficiency in carrying out the task of applying the protection sheet to a paint film may become lower, or the applied paint film protection sheet may partially come off the paint film, being unable to serve the protection purpose. When applied to a paint film having an uneven surface (especially, a paint film having a complex tridimensional configuration such as surfaces of vehicles including automobiles, etc.), or when the adhesion area is relatively large, etc., it is especially meaningful to increase the initial adhesiveness of the paint film protection sheet.

A PSA comprising a non-crosslinked rubber-based polymer as the base polymer has properties preferable for PSAs used in paint film protection sheets, such that it is essentially non-susceptible to accumulation of strain (even if a temporal strain is generated, the strain can be readily dissipated), being less likely to cause stress to the paint film, etc. However, since a non-crosslinked PSA generally tends to have poor cohesive strength, it has been particularly difficult to increase the initial adhesiveness.

A paint film protection sheet is required a property preventing an event (adhesive transfer) that residues (typically, a part of PSA constituting a PSA layer) from the sheet is left on the paint film when a paint film protection sheet after use as a protective means is peeled (removed) from the paint film. Such a requirement has further intensified because of a demand for a higher quality appearance as part of an effort to increase the value of the goods (automobiles, etc.). A paint film protection sheet would be advantageous that is capable of having an improved ability to prevent adhesive transfer (adhesive transfer resistance), for instance, not only on paint films having a high smoothness, e.g., the surface of a new automobile, but even when the protection sheet is used on paint films having an undesirable surface state from the standpoint of preventing adhesive transfer, such as an automotive paint film after the vehicle has been used (e.g., a paint film exhibiting small surface irregularities, such as a paint film that has been polished and/or touched up).

The present invention was made in view of such circumstances, and an objective of the present invention is to provide a paint film protection sheet comprising a PSA that comprises a non-crosslinked rubber-based polymer as a base polymer, with the protection sheet having both great initial adhesiveness and great non-contaminating properties for a paint film while exhibiting higher adhesive transfer resistance for a paint film.

The present inventors have found that the problem can be resolved by adding to a non-crosslinked rubber-based polymer two species of tackifier resins of a high softening point tackifier resin and a low softening point tackifier resin with the mass ratio of the two tackifier resins being in specific range.

In other words, the present description provides a paint film protection sheet comprising a support substrate and a PSA layer placed on the support substrate. The PSA constituting the PSA layer comprises a rubber-based polymer as a base polymer, a tackifier resin having a softening point of 120° C. or above and tackifier resin having a softening point below 120° C. The mass ratio ($T_L/T_H$) of the tackifier resin ($T_L$) content relative to the tackifier resin ($T_H$) content has a value of 1.0 or larger and 30 or less. A paint film protection sheet having such a constitution has both great initial adhesiveness and great non-contaminating properties for a paint film while exhibiting higher adhesive transfer resistance for a paint film. It is preferable that the softening point difference of the tackifier resin ($T_H$) and the tackifier resin ($T_L$) is 30° C. or more.

In a preferable embodiment of the paint film protection sheet disclosed herein, the total amount of the tackifier resin ($T_H$) and the tackifier resin ($T_L$) is 1.0 part by mass or less relative to 100 parts by mass of the base polymer. Such a paint film protection sheet exhibits higher adhesive transfer resistance in addition to great initial adhesiveness and non-contaminating properties suitable for practical use.

In a preferable embodiment of the paint film protection sheet disclosed herein, the base polymer is isobutylene-based polymer. A paint film protection sheet comprising a PSA having such a composition is preferable because residue marks are less likely to be left on paint films.

In a preferable embodiment of the paint film protection sheet disclosed herein, the tackifier resin ($T_H$) is rosin-based resin. According to such a tackifier resin ($T_H$), can be obtained a paint film protection sheet combining high levels of initial adhesiveness and non-contaminating properties.

In a preferable embodiment of the paint film protection sheet disclosed herein, the tackifier resin ($T_L$) has an SP value of 8.5 or larger. According to such a tackifier resin ($T_L$), great adhesive properties can be obtained. When a base polymer is an isobutylene-based polymer, it is especially meaningful to use the tackifier resin ($T_L$) having the SP value.

In a preferable embodiment of the paint film protection sheet disclosed herein, the PSA layer has a thickness of 1 µm or larger, but smaller than 10 µm. Although adhesive transfer tends to occur in a PSA having such a thickness in general, according to the constitution of the present invention, adhesive transfer resistance increases.

In a preferable embodiment of the paint film protection sheet disclosed herein, the paint film protection sheet exhibits a holding time of 200 seconds or more in a constant load peel test. Such a paint film protection sheet can realize good initial adhesiveness.

BRIEF DESCRIPTION OF THE DRAWINGS

FIG. 1 shows a cross-sectional view schematically illustrating an embodiment of the paint film protection sheet according to the present invention.

FIG. 2 shows a diagram illustrating a method of a constant load peel test.

DETAILED DESCRIPTION OF THE INVENTION

Preferred embodiments of the present invention are described below. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

The paint film protection sheet according to the present invention may be, for example, a paint film protection sheet for automobiles, which can be used for protection of automobiles and their components. Alternatively, it may be a paint film protection sheet for various kinds of use excluding the paint film protection sheet for automobile. Such a paint film protection sheet comprises a PSA layer placed on a support substrate. FIG. 1 shows a cross-sectional constitution of the paint film protection sheet according to an embodiment of the present invention. The paint film protection sheet 10 has a constitution in which a first face 1A of a support substrate 1 retains a PSA layer 2, and is used by adhering it to a paint film via a surface 2A of the PSA layer 2. Herein, the term "paint film" refers to a paint film having an article to be protected for instance, a paint film having an article such as automobiles and their components, etc. Prior to use (i.e., before adhered to the paint film), the protection sheet 10 may be present such that the surface (an adhesive face, i.e., a surface to be adhered to the paint film) 2A of the PSA layer 2 is protected with a release liner (not shown in the drawing) having a release surface at least on the PSA layer side. Alternatively, the protection sheet 10 may be present such that the protection sheet 10, with a second face (back face) 1B of the support substrate 1 being a release face, is wound in a roll such that the second face contacts the PSA layer 2 and protects the surface (adhesive face) 2A.

[Support Substrate]

As the support substrate of the paint film protection sheet disclosed herein, can be used a resin film, paper, fabric, a rubber sheet, a foam sheet, metal foil, a composite of these, or the like. Examples of resin films include films of polyolefins (polyethylene, polypropylene, ethylene-propylene copolymers, etc.), polyester films, vinyl chloride resin films, vinyl acetate resin films, polyimide resin films, polyamide resin films, fluorinated resin films, cellophane, and the like. Examples of paper include Washi paper, kraft paper, glassine paper, high grade paper, synthetic paper, top-coated paper and the like. Examples of fabrics include woven fabrics and non-woven fabrics, etc., of a single species or a blend of various fibrous substances. Examples of fibrous substances include cotton, staple fiber, Manila hemp, pulp, rayon, acetate fibers, polyester fibers, polyvinyl alcohol fibers, polyamide fibers, polyolefin fibers, and the like. Examples of rubber sheets include natural rubber sheets, butyl rubber sheets, and the like. Examples of foam sheets include polyurethane foam sheets, polychloroprene foam sheets, and the like. Examples of metal foil include aluminum foil, copper foil, and the like.

The art disclosed herein can be applied preferably to a paint film protection sheet using as its support substrate a resin sheet primarily comprising a resin component such as polyolefin, polyester (e.g., polyethylene terephthalate (PET)), or the like. Here, the term "resin sheet" can typically be a resin film formed of (molded from) a composition primarily comprising a resin component. The resin sheet is typically a non-porous resin film. The "non-porous resin film" referred to herein should be conceptually distinguished from the so-called non-woven fabric (i.e., meaning to exclude non-woven fabrics). An especially preferable application may be a paint film protection sheet wherein the primary component among resin components constituting the support substrate is a polyolefin-based resin. In other word, such a paint film protection sheet comprises a polyolefin-based resin sheet as a support substrate. A support substrate having such a composition is preferable from the standpoint of recyclability and so on. For example, can be preferably used a polyolefin-based resin sheet of which 50% by mass or more is a polyethylene (PE) resin or a polypropylene (PP) resin. In other words, in the polyolefin-based resin sheet, the total amount of PE resins and PP resins combined can account for 50% by mass or more of the entire support substrate.

As the polyolefin-based resin sheet, can be preferably used a resin sheet (or a "PP resin sheet" hereinafter) wherein the resin component constituting the sheet primarily comprises a PP resin. Typically, in the PP resin sheet, the resin component comprises a PP resin at a ratio higher than 50% by mass, for example, the resin component comprises a PP resin at a ratio of preferably about 60% by mass or higher (more preferably about 70% by mass or higher). The resin component of the resin sheet may be composed essentially of one or two or more of PP resins. In other words, the polyolefin-based resin sheet may be a resin sheet comprising a PP resin alone as a resin component, or, for example, a resin sheet in which an amount of a resin component other than a PP resin is less than 1% by mass of total resin components.

From the standpoint of the heat resistance etc., can be preferably used a resin sheet comprising a continuous phase (continuous constitution) of a PP resin. The paint film protection sheet employing, as a support substrate, a resin sheet having such a continuous constitution of a PP resin is preferable, for example, because of being likely to prevent a paint film protection sheet from coming off a paint film (e.g. paint film of automobile) by a thermal history of temperature increase etc. during outside application.

The support substrate may have a single-layer structure, or a layered structure with two or more layers. When it has a layered structure, it is preferable that at least one layer comprises a continuous PP resin phase. The remainder of the resin can be a polyolefin resin (e.g. PE resin) primarily comprising an olefin-based polymer formed of ethylene or an α-olefin having four or more of carbon atoms as the primary monomer, or a resin other than a polyolefin-based resin. An example of a resin sheet that can be preferably used as a support substrate of the paint film protection sheet disclosed herein is a polyolefin-based resin sheet of which the resin component consists essentially of a PP resin and a PE resin. Typically, such a polyolefin-based resin sheet may be a PP sheet wherein the primary component of the resin is a PP resin and the remainder is a PE resin.

The primary component of the PP resin can be a polymer (a propylene-based polymer) of various types that contains propylene as a constituent. It can be a PP resin consisting essentially of one, two or more species of propylene-based polymer. The concept of the propylene-based polymer referred to herein include, for instance, the following polypropylenes:

Propylene homopolymer (homopolypropylenes) such as isotactic polypropylenes.

Random copolymers (random polypropylenes) of propylene and other α-olefin(s) (typically, one, two or more species selected from ethylene and α-olefins having 4 to 10 carbon atoms); preferably random polypropylenes constituted with propylene as the primary monomer (a main monomer, i.e., a component accounting for 50% by mass or more of all monomers); for instance, a random polypropylene obtained by random copolymerization of 96 to 99.9 mol % of propylene and 0.1 to 4 mol % of another α-olefin (preferably ethylene and/or butene).

Block copolymers (block polypropylenes) comprising a copolymer (preferably a copolymer wherein the primary monomer is propylene) obtained by block copolymerization of propylene and other α-olefin(s) (typically, one, two or more species selected from ethylene and α-olefins having 4 to 10 carbon atoms), and typically, further comprising as a by-product of the block copolymerization a rubber formed of at least either one of propylene and the other α-olefin; for instance, a block polypropylene comprising a polymer obtained by block copolymerization of 90 to 99.9 mol % of propylene and 0.1 to 10 mol % of other α-olefin(s) (preferably ethylene and/or butene), and further comprising as a by-product a rubber formed of at least either one of propylene and the other α-olefin.

The PP resin can be formed essentially of one, two or more species of such propylene-based polymer, or can be a thermoplastic olefin resin (TPO) or a thermoplastic elastomer (TPE) of a reactor blend type obtainable by copolymerizing a propylene-based polymer with a large amount of a rubber component, or of a dry blend type obtainable by mechanically dispersing the rubber component in a propylene-based polymer. Alternatively, it can be a PP resin comprising a copolymer of propylene and other monomer(s) (functional monomer) containing other functional group(s) in addition to a polymerizing functional group, a PP resin obtained by copolymerizing such a functional monomer with a propylene-based polymer, or the like.

The primary component of the PE resin can be a polymer (an ethylene-based polymer) of various types that contains ethylene as a constituent. It can be a PE resin consisting essentially of one, two or more species of ethylene-based polymer. The ethylene-based polymer can be an ethylene homopolymer or a product of copolymerization (random copolymerization, block copolymerization, etc.) of ethylene as the primary monomer and other α-olefin(s) as a secondary monomer. Preferable examples of the α-olefin include α-olefins having 3 to 10 carbon atoms such as propylene, 1-butene (which can be a branched 1-butene), 1-hexene, 4-methyl-1-pentene, 1-octene, and the like. For instance, a PE resin primarily comprising an ethylene-based polymer copolymerized with the α-olefin(s) as the secondary monomer of 10% by mass or less (typically, 5% by mass or less) is preferably employed.

It can be a PE resin comprising a copolymer of ethylene and a monomer (functional monomer) containing other functional group(s) in addition to a polymerizing functional group, a PE resin obtained by copolymerizing such a functional monomer with an ethylene-based polymer, or the like. Examples of a copolymer of ethylene and a functional monomer include ethylene-vinyl acetate copolymers (EVA), ethylene-acrylic acid copolymers (EAA), ethylene-methacrylic acid copolymers (EMAA), ethylene-methyl acrylate copolymers (EMA), ethylene-ethyl acrylate copolymers (EEA), ethylene-methyl methacrylate copolymers (EMMA), ethylene-(meth)acrylic acid (i.e., ethylene-acrylic acid, or ethylene-methacrylic acid) copolymers crosslinked by metal ions, and the like.

The density of the PE resin is not particularly limited, and it can be, for instance, about 0.9 g/cm$^3$ to 0.94 g/cm$^3$. Preferable PE resins include low-density polyethylene (LDPE) and linear low-density polyethylene (LLDPE). The PE resin may comprise one, two or more species of LDPE and one, two or more species of LLDPE. There are no particular limitations on the proportions of the respective LDPEs or LLDPEs, or the blend ratio of LDPE to LLDPE, and they can be suitably selected so as to obtain a PE resin that exhibits desirable properties.

Although not particularly limited, as the resin material constituting the support substrate, can be preferably used a resin material having a MFR (melt flow rate) of approximately 0.5 g/10 min to 80 g/10 min (e.g., 0.5 g/10 min to 10 g/10 min). Herein, the MFR refers to a value measured by method A at a temperature of 230° C. and an applied load of 21.18 N based on JIS K 7210. The resin material can be a polyolefin-based resin (e.g., a PP resin, a PE resin, a blend resin of a PP resin and a PE resin, or the like) having a MFR in the said range.

The resin sheet (preferably a polyolefin-based resin sheet) used as a substrate of the paint film protection sheet disclosed herein may contain as necessary suitable components allowed for inclusion in the substrate in accordance with desired properties such as light-blocking ability, weatherability, heat resistance, consistent coating, adhesive properties, and so on. For example, it may suitably contain additives such as pigments (typically inorganic pigments), fillers, antioxidants, photo-stabilizing agents (meaning to include radical scavengers, UV (ultraviolet rays)-absorbing agents, etc.), slipping agent, anti-blocking agent, and so on. Examples of materials that can be preferably used as pigments or fillers include inorganic powders such as titanium oxide, zinc oxide, calcium carbonate, and the like. The amount of an inorganic pigment or a filler can be suitably selected in consideration of the extent of the effects produced by the additive and the substrate moldability suitable for the method (casting, blow molding (inflation molding), etc.) employed for forming the resin sheet. It is usually preferable that the amount of a pigment or a filler (when several species are added, their combined amount) is about 2 to 20 parts by mass (more preferably about 5 to 15 parts by mass) relative to 100 parts by mass of the resin component. For example, each additive can be added in an amount equal to that normally employed in the field of resin sheets used as support substrates in paint film protection sheets (e.g., paint film protection sheet for automobile).

The resin sheet (preferably a polyolefin-based resin sheet) can be produced by employing a suitable film formation method heretofore known. For example, can be preferably employed a method that involves extrusion of a molding material containing the resin component (preferably, a resin component consisting of a PP resin solely, or a resin component comprising a PP resin as the primary component and a PE resin as a secondary component) and additives, etc., added as necessary.

In support substrate 1 (typically a resin sheet) shown in FIG. 1, face (front face) 1A to which PSA layer 2 is to be provided can be pre-subjected to a surface treatment such as an acid treatment, corona discharge treatment, UV irradiation, plasma treatment, or the like. In support substrate 1, face (back face) 1B opposite to the face to which PSA layer 2 is to be provided can be pre-subjected as necessary to a release treatment. This release treatment can be a treatment where a release agent based on silicone, a long-chain alkyl, or fluorine, etc., is applied to form a film having a thickness of typically about 0.01 µM to 1 µm (e.g., 0.01 µm to 0.1 µm). Such a release treatment can produce effects such as easy unwinding of a rolled paint film protection sheet 10, and so on.

The thickness of the support substrate is not particularly limited and can be suitably selected according to the intended purpose. Usually, it is suitable to use a substrate having a thickness of about 300 µm or smaller (e.g., about 10 µm to 200 µm). In a preferable embodiment of the paint film protection sheet disclosed herein, the substrate has a thickness of about 10 µm to 100 µm (e.g., about 20 µm to 60 µm, typically about 20 µm to 50 µm). For instance, a paint film protection sheet formed by employing a support substrate having such a thickness is preferable for a paint film protection sheet for automobile.

[PSA Layer]
<Base Polymer>

The paint film protection sheet disclosed herein comprises a PSA layer which is a rubber-based PSA layer formed from a PSA composition comprising a rubber-based polymer as a base polymer. The term "base polymer" herein typically refers to a component accounting for the largest amount among polymeric components in a PSA composition (it may be a component accounting for whole polymeric components). The base polymer may be normally components that account for greater than 50% by mass (e.g., 70% by mass or greater) among the polymeric components. Examples of the base polymer disclosed above include various rubber-based polymers such as natural rubbers; styrene-butadiene rubbers (SBR); polyisoprene; butene-based polymers comprising a butene (including 1-butene, cis- or trans-2-butene, and 2-methylpropene (isobutylene)) as a primary monomer; ABA-type block copolymer rubbers and hydrogenation products thereof, for example, styrene-butadiene-styrene block copolymer rubbers (SBS), styrene-isoprene-styrene block copolymer rubbers (SIS), styrene-isobutylene-styrene block copolymer rubbers (SIBS), styrene-(vinyl isoprene)-styrene block copolymer rubbers (SVIS), styrene-ethylene-butylene-styrene block copolymer rubbers (SEBS) which are hydrogenation products of SBS, styrene-ethylene-propylene-styrene block copolymer rubbers (SEPS) which are hydrogenation products of SIS; and the like. Preferable examples of the butene-based polymer include isobutylene-based polymers. Specific examples of the isobutylene-based polymer include polyisobutylene, copolymers of isobutylene and isoprene, and the like.

The art disclosed herein can be applied to a paint film protection sheet comprising a PSA layer formed from a PSA (a non-crosslink-type PSA) wherein the base polymer is not crosslinked. Herein, the term "PSA layer formed from a non-crosslink-type PSA" refers to a PSA layer that has not been purposely subjected to a treatment (i.e., a crosslinking treatment, e.g., addition of a crosslinking agent, etc.) to form chemical bonds among base polymers while the PSA layer is being formed. Such a PSA layer has properties preferable for a PSA layer used in paint film protection sheets, such that it is essentially non-susceptible to accumulation of strain (even if a temporal strain is generated, the strain can be readily dissipated), being less likely to cause stress to the paint film, etc.

Examples of the non-crosslink-type PSA include a PSA comprising an ABA-type block copolymer rubber or its hydrogenation product as the base polymer, a PSA comprising an isobutylene-based polymer as the base polymer, and the like. Among these, a preferable PSA layer is constituted with a PSA (a polyisobutylene-based PSA) formed from a PSA composition comprising an isobutylene-based polymer as the base polymer. Such a PSA layer is highly elastic and is preferable as a PSA (removable PSA) for use in a PSA sheet used in an embodiment where it is eventually removed such as a paint film protection sheet. A PSA layer formed from the polyisobutylene-based PSA generally yields a large difference in the solubility parameter (SP value) relative to paint films (e.g., paint films on automobiles); and therefore, migration of substances is unlikely to occur between the two, and being a non-crosslink-type, it is unlikely to leave adhesion marks on paint films. Thus, the paint film protection sheet comprising such a PSA layer is preferable as a paint film protection sheet (e.g., a paint film protection sheet for automobiles).

In a preferable embodiment of the paint film protection sheet disclosed herein, among the polymeric components in the PSA, greater than 50% by mass (e.g., 70% by mass or greater, or even 85% by mass or greater) is an isobutylene-based polymer. The PSA may be essentially free of a polymeric component other than an isobutylene-based polymer. In such a PSA, for instance, the proportion of polymers other than an isobutylene-based polymer may be 1% by mass or less of the polymeric components, or it may be below detection limits.

In the present description, the "isobutylene-based polymer" is not limited to polyisobutylenes (homopolymer of isobutylene), but the concept thereof encompasses even copolymers comprising isobutylene as the primary monomer. Such copolymers include a copolymer in which isobutylene accounts for the largest amount among the monomers constituting the isobutylene-based polymer. In typical, it may be a copolymer in which isobutylene accounts for greater than 50% by mass or even 70% by mass or greater of the monomers. Examples of the copolymer include copolymers of isobutylene and normal butylene, copolymers of isobutylene and isoprene, vulcanized or modified products of these, and the like. Examples of such copolymers include butyl rubbers such as regular butyl rubbers, chlorinated butyl rubbers, brominated butyl rubbers, partially crosslinked butyl rubbers and the like. Examples of the vulcanized or modified products include those modified with functional groups such as hydroxyl group, carboxyl group, amino group, epoxy group, and the like. From the standpoint of the stability of adhesive strength (e.g., a property that suppresses an excessive increase in the adhesive strength due to aging or a thermal history), preferably usable isobutylene-based polymers may include polyisobutylenes, copolymers of isobutylene and normal butylene, and the like. Such a copolymer may be, for example, an isobutylene/normal butylene copolymer, with the copolymerization ratio of normal butylene being smaller than 30 mol %.

Preferable examples of the isobutylene-based polymer in the art disclosed herein include polyisobutylenes. In the present description, "polyisobutylene" is a polyisobutylene comprising monomers other than isobutylene at a copolymerization ratio of 10% by mass or smaller (preferably 5% by mass or smaller). In particular, homopolyisobutylenes are preferable.

The molecular weight of the isobutylene-based polymer (typically a polyisobutylene) is not particularly limited. For instance, an isobutylene-based polymer having a weight average molecular weight (Mw) of about $10 \times 10^4$ to $150 \times 10^4$ can be suitably selected and used. Two or more isobutylene-based polymers having individually different Mw values may be used in combination. The isobutylene-based polymer used as the base polymer as a whole preferably has a Mw value in a range of about $20 \times 10^4$ to $150 \times 10^4$ (more preferably about $30 \times 10^4$ to $100 \times 10^4$).

The isobutylene-based polymer (typically a polyisobutylene) may have a number average molecular weight (Mn) of, about $10 \times 10^4$ to $40 \times 10^4$. Two or more isobutylene-based polymers having individually different Mn values may be used in combination. The isobutylene-based polymer used as the base polymer as a whole preferably has a Mn value in a range of about $10 \times 10^4$ to $40 \times 10^4$ (more preferably about $12 \times 10^4$ to $30 \times 10^4$).

When the Mw or Mn value is far above the range given above, the solution viscosity of the PSA may turn out too high, giving rise to a tendency for the PSA solution to exhibit poorer handling properties (e.g., coating consistency). When the Mw or Mn value is far below the range given above, the cohesive strength of the PSA may tend to turn out insufficient and may be likely to produce adhesive transfers if used under demanding conditions (e.g., when adhered to a face resurfaced by polishing).

Part or all of the isobutylene-based polymer may be an isobutylene-based polymer (a masticated product) obtained from an isobutylene-based polymer with a higher molecular weight via a mastication process to lower the molecular weight (preferably to lower the weight average molecular weight to the preferable range described above). The mastication process can be preferably carried out so as to obtain an isobutylene-based polymer having a Mw value equal to approximately 10% to 80% of the pre-mastication value. It is also preferable to carry out the process so as to obtain an isobutylene-based polymer having a number average molecular weight (Mn) of about $10 \times 10^4$ to $40 \times 10^4$. Such a mastication process can be performed based on the contents of Japanese Patent No. 3878700.

The Mw and Mn values herein refer to the values calibrated with polystyrene standard, which can be determined based on gel permeation chromatography (GPC) analyses. As a GPC system, can be used, for instance, model number "HLC-8120GPC" available from Tosoh Corporation.

As the base polymer (e.g., an isobutylene-based polymer, typically a polyisobutylene) of the PSA, is preferably used a polymer comprising two or more different polymer species having different molecular weight distributions. Herein, having different molecular weight distributions means that elution peaks in their GPC spectra have different elution times and/or shapes. According to a PSA having such a composition, by modifying the selection of the two or more different polymer species and their relative amounts, at least one (preferably both) of the dispersion degree (Mw/Mn) and the viscosity of the PSA can be readily adjusted to be in the preferable range disclosed herein while having Mw and Mn values in prescribed ranges. It is preferable that as the base polymer, two or more different polymer species having different Mw values are contained. The presence of two or more different polymer species having different Mw values can be confirmed, for example, with a molecular weight distribution having two or more elusion peaks with maxima at different elusion times (i.e., being bi-modal (double-peaked), or triple or more-peaked) in the GPC analysis. It is noted that each of the two or more different polymer species typically exhibits a uni-modal (single-peaked) molecular weight distribution.

As the two or more different polymer species having different Mw values, can be used, for instance, a suitable combination of polymers having a Mw value in a range of $1 \times 10^4$ to $130 \times 10^4$. It is preferable to select the two or more different polymer species so that the polymer with the highest molecular weight has a Mw value five times or more (e.g., 5 to 20 times, typically about 8 to 12 times) the Mw value of the polymer with the lowest molecular weight. The dispersion degree (Mw/Mn) of each polymer is preferably, for example, 1.5 or larger (more preferably 2 or larger, e.g., 2 to 5).

In a preferable embodiment, the base polymer comprises at least one species of higher molecular weight polymer $P_H$ having a Mw value in a range of $70 \times 10^4$ to $130 \times 10^4$ (preferably $70 \times 10^4$ to $120 \times 10^4$, e.g., $70 \times 10^4$ to $100 \times 10^4$) and at least one species of lower molecular weight polymer $P_L$ having a Mw value in a range of $3 \times 10^4$ to $20 \times 10^4$ (typically $4 \times 10^4$ to $10 \times 10^4$). A preferable higher molecular weight polymer $P_H$ may have a dispersion degree (Mw/Mn) of 2 to 5. A preferable lower molecular weight polymer $P_L$ may have a dispersion degree (Mw/Mn) of 1.5 to 3.5. The base polymer may further comprise a polymer having a Mw value somewhere intermediate between those of the $P_H$ and $P_L$. The total amount of the $P_H$ and $P_L$ preferably accounts for 70% by mass or greater (e.g., 80% by mass or greater, typically 90% by mass or greater) of the base polymer as a whole. The base polymer of the PSA may consist essentially of a $P_H$ and a $P_L$.

The ratio of the two or more different polymer species can be suitably selected so as to produce a preferable molecular weight distribution (Mw and Mn values, preferably even the dispersion degree (Mw/Mn)) or a preferable viscosity value disclosed herein. For example, the $P_H$-to-$P_L$ mass ratio ($P_H/P_L$) is preferably 95/5 to 50/50 (e.g., 95/5 to 70/30, typically 90/10 to 75/25). In order to produce higher adhesive transfer resistance, it is preferable to form the composition such that the $P_H$ accounts for 60% by mass or greater (typically 60 to 95% by mass, e.g., 70 to 95% by mass) of the base polymer as a whole. In a preferable embodiment, each of the $P_H$ and $P_L$ is an isobutylene-based polymer (typically a polyisobutylene).

In a preferable embodiment, the base polymer as a whole has a dispersion degree (Mw/Mn) of 3.5 or larger, or more preferably 5 or larger. According to a paint film protection sheet comprising a PSA that comprises such a base polymer, can be produced even a higher level of adhesive transfer resistance. While in general the solution viscosity of a PSA tends to increase as the Mw value of the base polymer increases, with the dispersion degree being equal to or larger than a prescribed value as described above, the PSA can be formed to have a solution viscosity that is low for its Mw value. This is advantageous from the standpoint of the handling properties of the PSA composition (e.g., ease of handling during preparation, pumping, application, etc., of the PSA composition). The base polymer as a whole may have a dispersion degree of 5 or larger, 5.5 or larger, or even 6 or larger. While the upper limit of the dispersion degree of the base polymer as a whole is not particularly limited, it is usually preferable to be 7.5 or smaller (e.g., 7 or smaller).

<Tackifier Resin>

The PSA can comprise a tackifier resin as necessary. Examples of preferable tackifier resins include rosin-based resins, terpene-based resins, petroleum resins, phenol resins, alkylphenol resins, xylene resins, coumarone-indene resins, alkyd resins, epoxy resins, hydrogenation products of these, and the like. Among these tackifier resins, can be used one species solely or a suitable combination of two or more species.

Examples of the rosin-based resin include unmodified rosins (raw rosins) such as gum rosin, wood rosin, tall-oil rosin, etc.; modified rosins (hydrogenated rosins, disproportionated rosins, polymerized rosins, other chemically-modified rosins, etc.) obtainable from the unmodified rosins via modifications such as hydrogenation, disproportionation, polymerization, etc.; various other rosin derivatives; and the like.

Examples of the rosin derivatives include rosin esters such as compounds obtainable from unmodified rosins via esterification with alcohols (i.e., esterification products of unmodified rosins), compounds obtainable from modified rosins (hydrogenated rosins, disproportionated rosins, polymerized rosins, etc.) via esterification with alcohols (i.e., esterification products of modified rosins), etc.; unsaturated fatty-acid-modified rosins obtainable from unmodified rosins or modified rosins (hydrogenated rosins, disproportionated rosins, polymerized rosins, etc.) via modifications with unsaturated fatty acids; unsaturated fatty-acid-modified rosin esters obtainable from rosin esters via modifications with unsaturated fatty acids; rosin alcohols obtainable via reduction of carboxyl groups from unmodified rosins, modified rosins (hydrogenated rosins, disproportionated rosins, polymerized rosin, etc.), unsaturated fatty-acid-modified rosins or unsaturated fatty-acid-modified rosin esters; metal salts of rosins (particularly rosin esters) such as unmodified rosins, modified rosins, various rosin derivatives, etc.; rosin phenol resins obtainable from rosins (unmodified rosins, modified rosins, various rosin derivatives, etc.) via addition of phenol in the presence of an acid catalyst followed by thermal polymerization; and so on.

Examples of the terpene-based resins include terpene resins (or "unmodified terpene resins" hereinafter so as to clearly distinguish these from modified terpene resins described next) such as α-pinene polymers, β-pinene polymers, dipentene polymers, etc.; modified terpene resins obtainable from terpenes or terpene resins via modifications (e.g., phenol modification, styrene modification, hydrogenation, hydrocarbon modification, and so on); and so on. Examples of the modified terpene resins include terpene-phenol resins, styrene-modified terpene resins, hydrogenated terpene resins, and so on.

The term "terpene-phenol resin" refers to a polymer containing terpene residue and phenol residue, and the scope thereof encompasses both a terpene-phenol copolymer resin (a copolymer of a terpene and a phenolic compound) and a phenol-modified terpene resin (a phenol-modification product of a terpene homopolymer or a terpene copolymer (a terpene resin, typically an unmodified terpene resin)). Preferable examples of the terpene in the terpene-phenol resin include mono-terpenes such as α-pinene, β-pinene, limonene (including d-limonene, 1-limonene, and dn-limonene (dipentene)), and the like.

<Tackifier Resin ($T_H$) Having a Softening Point of 120° C. or Above>

The PSA in the art disclosed herein comprises a tackifier resin ($T_H$) having a softening point of 120° C. or above as the tackifier resin. According to a PSA having such a composition, can be obtained a paint film protection sheet combining higher levels of initial adhesiveness and non-contaminating properties. According to a tackifier resin ($T_H$) having a softening point of 125° C. or above (more preferably 130° C. or above, even more preferably 140° C. or above), even greater effects can be produced. The upper limit of the softening point of the tackifier resin ($T_H$) is not particularly limited. From the standpoint of the availability and the cost, etc., it is preferable to use a tackifier resin ($T_H$) having a softening point of 200° C. or below (typically, 120° C. to 200° C.) or more preferably 180° C. or below (e.g., 140° C. to 180° C.). The art disclosed herein for example can be practiced preferably in an embodiment where the PSA comprises a tackifier resin ($T_H$) having a softening point of 150° C. or above (e.g., 150° C. to 200° C., more preferably 150° C. to 180° C.).

As the tackifier resin ($T_H$), can be suitably used a tackifier resin having a desirable softening point among various tackifier resins as those described above. For the tackifier resin ($T_H$), can be used one species solely or a suitable combination of two or more species. As the tackifier resins ($T_H$), can be used, for example, rosin-based resins such as hydrogenated rosins, rosin esters, etc.; terpene-based resins such as terpene-phenol resins, etc.; and the like. In a preferable embodiment, as the tackifier resin ($T_H$), a rosin ester (an esterification product of an unmodified rosin, an esterification product of a polymerized rosin, an esterification product of a disproportionated rosin, an esterification product of a hydrogenated rosin, or the like) is used. According to such a tackifier resin ($T_H$), can be obtained a paint film protection sheet combining higher levels of initial adhesiveness and non-contaminating properties.

A preferable tackifier resin ($T_H$) may have an acid value of 50 mgKOH/g or lower (e.g., 40 mgKOH/g or lower, typically 30 mgKOH/g or lower). Use of such a tackifier resin ($T_H$) is advantageous from the standpoint of the weatherability of the paint film protection sheet. It is usually preferable to use a tackifier resin ($T_H$) having an acid value of 5 mgKOH/g or higher (e.g., 5 mgKOH/g to 50 mgKOH/g). According to such a tackifier resin ($T_H$), increase in the peel strength can be suppressed more effectively.

Herein, the acid value of a tackifier resin refers to a value measured by the following method. For neutralization titration, can be used a titration system under model number "COMTITE-550" available from Hiranuma Sangyo Corporation as an example.

[Acid Value (AV)]

A solvent mixture containing toluene, isopropanol and distilled water at a mass ratio of 50:49.5:0.5 is prepared. Approximately 0.5 g (based on the solid content) of a tackifier resin to be measured is accurately weighed out and dissolved in 50 g of the solvent mixture to prepare a sample solution for titration. The sample solution is titrated to neutral with a decinormal aqueous KOH solution. From the results obtained, the acid value of the tackifier resin is determined based on the equation (I) below:

$$\text{Acid value(mgKOH/g)} = (a-b) \times 5.611 \times F/S \qquad (I)$$

wherein, a: amount in mL of the aqueous KOH solution required to titrate the sample solution b: amount in mL of the aqueous KOH solution required to titrate the blank (the solvent mixture)

F: factor of the aqueous KOH solution

S: mass in g of the tackifier resin contained in the sample solution subjected to the titration.

The tackifier resin ($T_H$) content in the PSA disclosed herein is suitably 1.0 part by mass or less (i.e., more than zero part by mass, but 1.0 part by mass or less, typically 0.01 to 1.0 part by mass) relative to 100 parts by mass of the base polymer. According to a finding by the present inventors, a high softening point tackifier resin ($T_H$) can increase the initial adhesiveness effectively by a smaller amount as compared to a tackifier resin having a lower softening point (typically below 120° C.). In other words, according to a high softening point tackifier resin ($T_H$), as compared to a lower softening point tackifier resin, the amount of tackifier resin capable of producing desirable initial adhesiveness can be reduced. From the standpoint of the non-contaminating properties relative to paint film, it is advantageous to be able to use less tackifier resin. Thus, according to a PSA having the composition containing a tackifier resin ($T_H$) at 1.0 part by mass or less relative to 100 parts by mass of the base polymer, can be obtained a paint film protection sheet combining higher levels of initial adhesiveness and non-contaminating properties. The amount of the tackifier resin ($T_H$) used relative to 100 parts by mass of the base polymer can be 0.8 part by mass or less or 0.6 part by mass or less (e.g., 0.01 to 0.6 part by mass). The art disclosed herein may be practiced preferably in an embodiment where the amount of the tackifier resin ($T_H$) used relative to 100 parts by mass of the base polymer is less than 0.5 part by mass (e.g., 0.3 part by mass or less, or even 0.2 part by mass or less). From the standpoint of preferably producing the effects by the tackifier resin ($T_H$), the lower limit of the tackifier resin ($T_H$) content is preferably 0.05 part by mass or greater (e.g., 0.1 part by mass or greater) relative to 100 parts by mass of the base polymer.

<Tackifier Resin ($T_L$) Having a Softening Point Below 120° C.>

The PSA can comprise a tackifier resin ($T_L$) having a softening point below 120° C. The art disclosed herein can be practiced preferably in an embodiment where the PSA comprises a tackifier resin ($T_L$) in addition to the tackifier resin ($T_H$). According to the embodiment comprising a tackifier resin ($T_H$) and a tackifier resin ($T_L$) together, can be obtained a paint film protection sheet combining good initial adhesiveness and non-contaminating properties along with excellent adhesive transfer resistance relative to paint film. A preferable tackifier resin ($T_L$) may have a softening point of 60° C. or above (typically 60° C. to 110° C.). In a preferable embodiment, a tackifier resin ($T_L$) having a softening point of 60° C. to 100° C. (e.g., 70° C. to 100° C.) is used. According to such a tackifier resin ($T_L$), even greater effects can be produced.

As the tackifier resin ($T_L$), can be suitably used a tackifier resin having a desirable softening point among various tackifier resins as those described earlier. For the tackifier resin ($T_L$), can be used one species solely or a suitable combination of two or more species. As the tackifier resin ($T_L$), can be used, for example, rosin-based resins, terpene-based resins, phenol resins, alkylphenol resins and the like.

A tackifier resin ($T_L$) resulting in a softening point difference ($T_H-T_L$) from the tackifier resin ($T_H$) of 10° C. or larger can preferably be used. The softening point difference ($T_H-T_L$) is more preferably 15° C. or larger or even more preferably 20° C. or larger (e.g., 30° C. or larger). In a preferable embodiment, a tackifier resin ($T_L$) with a softening point difference ($T_H-T_L$) of 40° C. or larger is used.

In the present description, the softening point of a tackifier resin is defined as a value measured based on the softening point test method (ring and ball method) specified in JIS K5902 and JIS K2207. In particular, a sample is quickly melted at a lowest possible temperature, and with caution to avoid bubble formation, the melted sample is poured into a ring to the top, with the ring being placed on top of a flat metal plate. After cooled, any portion of the sample risen above the plane including the upper rim of the ring is sliced off with a small knife that has been somewhat heated. Following this, a support (ring support) is placed in a glass container (heating bath) having a diameter of 85 mm or larger and a height of 127 mm or larger, and glycerin is poured into this to a depth of 90 mm or deeper. Then, a steel ball (9.5 mm diameter, weighing 3.5 g) and the ring filled with the sample are immersed in the glycerin while preventing them from touching each other, and the temperature of glycerin is maintained at 20° C.±5° C. for 15 minutes. The steel ball is then placed at the center of the surface of the sample in the ring, and this is placed on a prescribed location of the support. While keeping the distance between the ring top and the glycerin surface at 50 mm, a thermometer is placed so that the center of the mercury ball of the thermometer is as high as the center of the ring, and the container is heated evenly by projecting a Bunsen burner flame at the midpoint between the center and the rim of the bottom of the container. After the temperature has reached 40° C. from the start of heating, the rate of the bath temperature rise must be kept at 5° C.±0.5° C. per minute. As the sample gradually softens, the temperature at which the sample flows out of the ring and finally touches the bottom plate is read as the softening point. Two or more measurements of softening point are performed at the same time, and their average value is used.

With respect to a tackifier resin having a softening point of 100° C. or below, water can be used in place of glycerin in the softening point test method.

The tackifier resin ($T_L$) preferably has a weight average molecular weight (Mw) of 300 or larger (more preferably 400 or larger, even more preferably 500 or larger, e.g., 1000 or larger). The Mw value of the tackifier resin ($T_L$) is preferably $3 \times 10^4$ or smaller (more preferably $0.5 \times 10^4$ or smaller). This may produce great adhesive strength to paint films.

When the PSA comprises a tackifier resin ($T_L$), it is usually suitable that its content is 15 parts by mass or less (e.g., 5 parts by mass or less) relative to 100 parts by mass of the base polymer. From the standpoint of the non-contaminating properties, it is advantageous that the tackifier resin ($T_L$) content is 5 parts by mass or less (even 3 parts by mass or less) relative to 100 parts by mass of the base polymer. The art disclosed herein can be practiced preferably in an embodiment where the tackifier resin ($T_L$) content in the PSA is 1.0 part by mass or less (more preferably 0.8 part by mass or less, e.g., 0.5 part by mass or less) relative to 100 parts by mass of the base polymer. From the standpoint of preferably producing the effects by the tackifier resin ($T_L$), it is preferable that the lower limit of the tackifier resin ($T_L$) content is 0.05 part by mass or higher (e.g., 0.1 part by mass or higher, typically 0.2 part by mass or higher) relative to 100 parts by mass of the base polymer.

The art disclosed herein can be practiced preferably in an embodiment where the low softening point tackifier resin ($T_L$) content is equal to or higher than the high softening point tackifier resin ($T_H$) content. For example, the mass ratio ($T_L/T_H$) of the tackifier resin ($T_L$) content relative to the tackifier resin ($T_H$) content preferably has a value of 1.0 or larger (i.e., $T_L/T_H \geq 1.0$). The mass ratio ($T_L/T_H$) has a value of more preferably 1.25 or larger (typically 1.25 to 5.0), or even more preferably 1.5 or larger (1.5 to 5.0). According to a PSA having such a composition, can be obtained a paint film protection sheet exhibiting greater adhesive transfer resistance. While the upper limit of the mass ratio ($T_L/T_H$) value is not particularly limited, from the standpoint of producing the effects by the combined use of the tackifier resin ($T_H$) and the tackifier resin ($T_L$) to a greater extent, it is usually suitable that the mass ratio ($T_L/T_H$) value is 30 or smaller, or preferably 10.0 or smaller (typically, 5.0 or smaller).

The total amount of the high softening point tackifier resin ($T_H$) and the low softening point tackifier resin ($T_L$) which is used as necessary (i.e., the combined amount of all the tackifier resins contained in the PSA) can be, for instance, 10 parts by mass or less relative to 100 parts by mass of the base polymer, or it is usually suitable to be 5 parts by mass or less (e.g., 3 parts by mass or less). The art disclosed herein can be practiced preferably in an embodiment where the total tackifier resin content in the PSA is 1.0 part by mass or less (e.g., 0.5 part by mass or less). The total amount is preferably less than 0.5 part by mass. According to such an embodiment, can be obtained a paint film protection sheet combining great initial adhesiveness and non-contaminating properties suitable for practical use while exhibiting higher adhesive transfer resistance.

In the art disclosed herein, the proportion of the tackifier resin ($T_H$) to the total amount of all tackifier resins contained in the PSA can be, for instance, 20% by mass or higher, or it may be 30% by mass or higher.

It is suitable that the proportion of the low softening point tackifier resin ($T_L$) in all the tackifier resins (i.e., $T_L/(T_H+T_L)$) is 50% by mass or higher, or preferably 60% by mass or higher (typically 60% by mass to 90% by mass, e.g., 70% by mass to 85% by mass). According to a PSA having such a composition, the effects obtainable by using a tackifier resin ($T_H$) and a tackifier resin ($T_L$) together can be obtained to a greater extent.

<Tackifier Resin ($T_{hs}$) Having a SP Value of 8.5 or Larger>

In a preferable embodiment of the art disclosed herein, the PSA comprises a tackifier resin ($T_{hs}$) having an SP value (in $(cal/cm^3)^{1/2}$, the same applies hereinafter) of 8.5 or larger. As the tackifier resin ($T_{hs}$), can be preferably used, for instance, a tackifier resin having an SP value in a range of 8.5 to 15. As the tackifier resin ($T_{hs}$) in the art disclosed herein, for example, can be used phenolic compounds, amine-based compounds, rosin-based resins (e.g., unmodified rosins) and the like, all of which have the above-described SP value. For the tackifier resin ($T_{hs}$), can be used one species solely or a suitable combination of two or more species.

Herein, the SP value of a compound indicates the solubility of the compound and is a value calculated from the basic structure of the compound by the method suggested by Fedors. In particular, from the vaporization energy, $\Delta e$ (cal), of each atom or an atomic group at 25° C. as well as the molar volume, $\Delta v$ (cm$^3$), of the atom or the atomic group at the same temperature, the SP value is calculated according to the next equation:

$$SP\ value(\delta)=(\Sigma \Delta e/\Sigma \Delta v)^{1/2}$$

(Reference document: Hideki Yamamoto, "SP value fundamentals, application, and calculation method", 4th edition, published by Johokiko Co., Ltd., Apr. 3, 2006, pp. 66-67).

According to such a tackifier resin ($T_{hs}$), addition of a small amount can effectively increase the adhesive properties (e.g., the adhesive strength relative to a hard-to-adhere paint film). Thus, the art disclosed herein can be practiced preferably in an embodiment where the tackifier resin ($T_{hs}$) content in the PSA is 0.01 to 5 parts by mass (preferably 0.01 to 1.0 part by mass) relative to 100 parts by mass of the base polymer. Herein, hard-to-adhere paint film refers to, for example, a paint film on which n-hexadecane results in a contact angle of 15° or larger. The contact angle can be determined by procedures including: while keeping the paint film horizontal, an approximately 2 μL droplet of n-hexadecane is dropped on top of the paint film under an atmosphere at 23° C. and 65% RH, and the angle formed by the tangent line of the droplet and the surface of paint film is measured within one minute after the deposition of the droplet.

It is considered that when the tackifier resin ($T_{hs}$) having such an SP value is added to a PSA comprising a non-crosslinked rubber-based polymer (typically an isobutylene-based polymer, e.g., a polyisobutylene) as the base polymer, atypical miscible phases are locally formed around the interface between the PSA and the paint film (e.g., hard-to-adhere paint film protection sheet for automobile), contributing to increase the adhesive strength to the paint film. From the standpoint of the formation of the miscible phases and the capability to increase the adhesive strength, it is usually preferable to use a tackifier resin ($T_{hs}$) having a weight average molecular weight (Mw) of 300 or larger (more preferably 400 or larger, even more preferably 500 or larger, e.g., 1000 or larger). A preferable tackifier resin ($T_{hs}$) has a Mw value of $3\times10^4$ or smaller (more preferably $0.5\times10^4$ or smaller).

Preferable examples of a phenol-based compound that can be used as the tackifier resin ($T_{hs}$) may include phenol resins, alkylphenol resins, rosin-modified phenol-based resins and terpene-modified phenol resins. As the alkylphenol resin, for instance, can be preferably used an alkylphenol resin having a side chain alkyl group with 3 or more carbon atoms (typically an alkyl group having 3 to 18 (e.g., 5 to 12) carbon atoms), such as tert-butylphenol resins, tert-amylphenol resins, tert-octylphenol resins, and the like.

Preferable examples of the tackifier resin ($T_{hs}$) used for the PSA in the art disclosed herein can include phenol-based compounds having an SP value of 9.5 or larger (typically 9.5 to 15, e.g., 10 to 15). Examples of such a phenol-based compound include trade name "DUREZ 19900" available from Sumitomo Durez Co., Ltd.

The tackifier resin ($T_{hs}$) is typically a material not intended for absorbing UV rays or for trapping or stabilizing radicals when photo-degradation reactions occur within the system containing the resin. Thus, a material generally used as an antioxidant or a photo-stabilizing agent shall be distinguished from the tackifier resin ($T_{hs}$) referred to herein.

The tackifier resin ($T_{hs}$) may have a softening point of 120° C. or above, or it can be below 120° C. In other words, the tackifier resin ($T_{hs}$) may correspond to, for example, a tackifier resin ($T_H$) or a tackifier resin ($T_L$). From the standpoint of the non-contaminating properties, etc., a preferable tackifier resin ($T_{hs}$) has a softening point of, for instance, 40° C. or above (more preferably 60° C. or above).

It is usually suitable that when the PSA comprises a tackifier resin ($T_{hs}$) having a high SP value, its content is 5 parts by mass or less (e.g., 2.5 parts by mass or less) relative to 100 parts by mass of the base polymer. From the standpoint of the non-contaminating properties, it is advantageous that the tackifier resin ($T_{hs}$) content is 1.0 part by mass or less (typically 0.01 to 1.0 part by mass) relative to 100 parts by mass of the base polymer. The art disclosed herein can be practiced preferably in an embodiment where the tackifier resin ($T_{hs}$) content in the PSA is 0.8 part by mass or less (more preferably 0.5 part by mass or less, e.g., 0.01 to 0.4 part by mass) relative to 100 parts by mass of the base polymer. From the standpoint of preferably producing the effects by the tackifier resin ($T_{hs}$), the lower limit of the tackifier resin ($T_{hs}$) content is preferably 0.05 part by mass or higher (e.g., 0.1 part by mass or higher, typically 0.2 part by mass or higher) relative to 100 parts by mass of the base polymer.

The art disclosed herein can be practiced preferably in an embodiment where the high SP value tackifier resin ($T_{hs}$) content in the PSA is equal to or higher than the high softening point tackifier resin ($T_H$) content. For example, a mass ratio ($T_{hs}/T_H$) of the tackifier resin ($T_{hs}$) content to the tackifier resin ($T_H$) content preferably has a value of 1.0 or larger (i.e., $T_{hs}/T_H \geq 1.0$). The mass ratio ($T_{hs}/T_H$) has a value of more preferably 1.25 or larger (typically 1.25 to 5.0), or even more preferably 1.5 or larger (1.5 to 5.0). According to a PSA having such a composition, can be obtained a paint film protection sheet having well-balanced high levels of capability to prevent peel strength increase, initial adhesiveness, non-contaminating properties and adhesive transfer resistance. While the upper limit of the mass ratio ($T_{hs}/T_H$) value is not particularly limited, from the standpoint of producing the effects by the combined use of the tackifier resin ($T_H$) and the tackifier resin ($T_{hs}$) to a greater extent, it is usually suitable that the mass ratio ($T_{hs}/T_H$) value is 30 or smaller, or preferably 10.0 or smaller (typically, 5.0 or smaller).

<Combination of Tackifier Resins ($T_H$) and ($T_{hsL}$)>

The art disclosed herein can be practiced preferably in an embodiment where the PSA comprises a tackifier resin ($T_{hs}$) having an SP value of 8.5 or larger and a softening point below 120° C. (i.e., a tackifier resin ($T_{hs}$) that correspond to a tackifier resin ($T_L$); or "tackifier resin ($T_{hsL}$) hereinafter"). According to a PSA having a composition comprising a tackifier resin ($T_{hsL}$) in addition to a tackifier resin ($T_H$), can be obtained a paint film protection sheet that yields a smaller increase in the peel strength due to aging or a thermal history after adhesion (i.e., better prevents an increase in the peel strength) while exhibiting great initial adhesiveness.

Although it is not intended to limit the art disclosed herein, how the combined presence of a tackifier resin ($T_H$) having a high softening point and a tackifier resin ($T_{hsL}$) having a high SP value and a low softening point results in increased initial adhesiveness and prevents an increase in the peel strength at the same time can be considered for example as follows: That is, a paint film protection sheet prior to adhesion to a paint film (an article to be protected) is normally in a state where its adhesive face is protected with a release face (which can be a surface of a release liner, a back face of the paint film protection sheet, etc.) adhered to it. The release face is usually a low polar surface (e.g., a surface that has been treated with a silicone-based release agent, a surface made of a polyolefin such as polyethylene, etc.) while the surface of a paint film is relatively high polar as compared to the release face. Thus, when the adhesive face of the paint film protection sheet is exposed via removal of the release face and adhered to a paint film, the tackifier resin ($T_{hsL}$) having a high SP value and a low softening point contained in the PSA layer tends to migrate toward the interface between the adhesive face and the paint film. As a result, when a certain time period passes after the adhesion to the paint film, as compared to the immediate state after the adhesion, the PSA turns softer around the interface between the adhesive face and the paint film due to effects of the tackifier resin ($T_{hsL}$) that had migrated to the interface. It is considered that this contributes to combined high levels of immediate properties (e.g., initial adhesiveness) after adhesion and aged properties (suppression of peel strength increase, adhesive transfer resistance, etc.).

Such effects can be produced even when the high softening point tackifier resin ($T_H$) has a low SP value (e.g., smaller than 8.5) or when the tackifier resin ($T_H$) has a high SP value (e.g., 8.5 or larger). In general, a high softening point tackifier resin is less likely to migrate as compared to a low softening point tackifier resin; and therefore, even when a high softening point tackifier resin ($T_H$) having a high SP value is contained, the tackifier resin ($T_{hsL}$) having a high SP value and a low softening point is more likely to migrate to the interface, whereby the PSA can be effectively turned softer around the interface. It is usually preferable that the SP value difference ($T_{hsL} - T_H$) between the tackifier resin ($T_{hsL}$) and the tackifier resin ($T_H$) is larger than zero, or more preferably 0.5 or larger (e.g., 1 or larger).

From the standpoint of the likelihood of the tackifier resin ($T_{hsL}$) to migrate to the interface, a preferable tackifier resin ($T_{hsL}$) has a Mw value of 4000 or smaller (more preferably 3000 or smaller, e.g., 2000 or smaller). In a preferable embodiment, the tackifier resin ($T_{hsL}$) has a Mw value of 500 to 3000 (e.g., 1000 to 2000). For instance, can be preferably used an alkylphenol resin having such a Mw value (e.g., an alkylphenol resin having a side chain alkyl group of 3 or more carbon atoms while having an SP value of 10 to 15).

A preferably usable tackifier resin ($T_{hsL}$) gives rise to a softening point difference ($T_H - T_{hsL}$) from the tackifier resin ($T_H$) of 15° C. or larger. It is more preferable that the softening point difference ($T_H - T_{hsL}$) is 20° C. or larger (e.g., 30° C. or larger). In a preferable embodiment, a tackifier resin ($T_{hsL}$) giving rise to a softening point difference ($T_H - T_{hsL}$) of 40° C. or larger is used.

When the PSA comprises a tackifier resin ($T_{hsL}$) having a low softening point and a high SP value (or a low softening point/high SP value tackifier resin ($T_{hsL}$), hereinafter), it is usually suitable that its content is 5 parts by mass or less (e.g., 2.5 parts by mass or less) relative to 100 parts by mass of the base polymer. From the standpoint of the non-contaminating properties, it is advantageous that the tackifier resin ($T_{hsL}$) content is 1.0 part by mass or less (typically 0.01 to 1.0 part by mass) relative to 100 parts by mass of the base polymer. The art disclosed herein can be practiced preferably in an embodiment where the tackifier resin ($T_{hsL}$) content in the PSA is 0.8 part by mass or less (more preferably 0.5 part by mass or less, e.g., 0.01 to 0.4 part by mass) relative to 100 parts by mass of the base polymer. From the standpoint of preferably producing the effects by the tackifier resin ($T_{hsL}$), the lower limit of the tackifier resin ($T_{hsL}$) content is preferably 0.05 part by mass or higher (e.g., 0.1 part by mass or higher, typically 0.2 part by mass or higher) relative to 100 parts by mass of the base polymer.

The art disclosed herein can be practiced preferably in an embodiment where the low softening point/high SP value tackifier resin ($T_{hsL}$) content in the PSA is equal to or higher than the high softening point tackifier resin ($T_H$) content. For example, the tackifier resin ($T_{hsL}$) content to the tackifier resin ($T_H$) content mass ratio ($T_{hsL}/T_H$) preferably has a value of 1.0 or larger (i.e., $T_{hsL}/T_H \geq 1.0$). The mass ratio ($T_{hsL}/T_H$) has a value of more preferably 1.25 or larger (typically 1.25 to 5.0), or even more preferably 1.5 or larger (typically 1.5 to 5.0). According to a PSA having such a composition, can be obtained a paint film protection sheet having well-balanced high levels of capability to prevent peel strength increase, initial adhesiveness, non-contaminating properties and adhesive transfer resistance. While the upper limit of the mass ratio ($T_{hsL}/T_H$) value is not particularly limited, from the standpoint of producing the effects by the combined use of the tackifier resin ($T_H$) and the tackifier resin ($T_{hsL}$) to a greater extent, it is usually suitable that the mass ratio ($T_{hsL}/T_H$) value is 30 or smaller, or preferably 10.0 or smaller (typically, 5.0 or smaller).

The art disclosed herein can be practiced preferably in an embodiment where the low softening point/high SP value tackifier resin ($T_{hsL}$) content in the total amount of all the tackifier resins contained in the PSA is 50% by mass or higher (e.g., 50% by mass to 90% by mass). For example, in a preferable embodiment, the tackifier resin ($T_{hsL}$) content in the total amount of all the tackifier resins is 60% by mass or higher (typically 60% by mass to 90% by mass, e.g., 70% by mass to 85% by mass). According to a PSA having such a composition, can be obtained a paint film protection sheet having well-balanced high levels of capability to prevent peel strength increase, initial adhesiveness, non-contaminating properties and adhesive transfer resistance.

When the PSA comprises a tackifier resin ($T_H$) and a tackifier resin ($T_{hsL}$), the combined amount of the tackifier resin ($T_H$) and the tackifier resin ($T_{hsL}$) contained in the PSA can be, for instance, 3 parts by mass or less, preferably 1.0 part by mass or less (e.g., 0.5 part by mass or less) or more preferably less than 0.5 part by mass relative to 100 parts by mass of the base polymer. According to such a PSA, can be obtained a paint film protection sheet exhibiting well-balanced high levels of initial adhesiveness, non-contaminating properties and adhesive transfer resistance.

<Other Additives>

The PSA used in the paint film protection sheet disclosed herein may contain as necessary suitable components (additives) allowed for inclusion in the PSA in addition to the base polymer, the tickifier resin ($T_H$), and tackifier resins ($T_L$), ($T_{hs}$) according to necessary. Examples of such additives include softeners, release agents, pigments, fillers, antioxidant, light-stabilizing agents (meaning to include radical scavengers, UV absorbers, etc.) and the like. Examples of a softener include rubber-based materials having low molecular weights, process oils (typically paraffin-based oils), petroleum-based softeners, epoxy-based compounds, and the like. Examples of a release agent include silicone-based release agents, paraffin-based release agents, polyethylene wax, acrylic polymers and the like. When using a release agent, its amount can be, for instance, about 0.01 to 5 parts by mass relative to 100 parts by mass of the base polymer. Alternatively, the PSA may have a composition essentially free of such a release agent. Examples of pigments and fillers include inorganic powders such as titanium oxide, zinc oxide, calcium oxide, magnesium oxide, silica and the like.

Each of these additives can be used solely as a single species or in a combination of two or more species. Each additive can be used in an amount usually employed in the field of the PSA used for paint film protection sheets (e.g. paint film protection sheet for automobile). The total amount of the tackifier and other additives combined is preferably 30 parts by mass or less (more preferably 15 parts by mass or less, e.g. 5 parts by mass or less) relative to 100 parts by mass of the base polymer.

<Formation Method, Constitution and Properties>

The PSA layer can be formed based on a method for forming PSA layers known in the PSA sheet field. For instance, can be preferably employed a method (direct method) where a PSA layer is formed by directly providing (typically applying) a PSA composition to a support substrate and allowing the composition to dry, with the PSA composition being obtainable by dissolving or dispersing in a suitable solvent a PSA-layer-forming material mixture comprising a polymeric component and additives added as necessary. Alternatively, can be employed a method (transfer method) where a PSA layer is transferred to a support substrate, with the PSA layer having being pre-formed on a highly releasable surface (e.g., a release liner surface, the back face of a support substrate that has been processed with a release treatment, etc.) by applying the PSA composition thereto and allowing the composition to dry. The PSA composition can be applied, for instance, using a known or commonly used coater such as a gravure roll coater, reverse roll coater, kiss roll coater, dip roll coater, bar coater, knife coater, spray coater, or the like. From the standpoint of facilitating the crosslinking reaction and increasing the production efficiency, etc., it is preferable to allow the PSA composition to dry with heating. It is usually preferable that the drying temperature is set, for example, around 40° C. to 120° C. While the PSA layer is typically formed to have a continuous phase, it can be formed to have a regular or random pattern of dots, stripes, etc., depending on the purpose and intended use.

The form of the PSA composition is not particularly limited, and can be, for instance, a PSA composition (a solvent-based PSA composition) containing a PSA (an adhesive component) having such a composition described above in an organic solvent, a PSA composition (water-dispersed PSA composition, typically an aqueous emulsion-based PSA composition) containing a PSA dispersed in an aqueous solvent, a hot-melt PSA composition, or the like. From the standpoint of the ease of application and the latitude in the choice of a substrate, etc., a solvent-based or a water-dispersed PSA composition can be used preferably. For obtaining even greater adhesive properties, a solvent-based PSA composition can be used preferably in particular. Typically, such a solvent-based PSA composition can be prepared as a solution containing the respective components described above in an organic solvent. The organic solvent can be selected among known or commonly used organic solvents. For instance, can be used any one species or a mixture of two or more species among aromatic compounds (typically aromatic hydrocarbons) such as toluene, xylene, etc.; acetic acid esters such as ethyl acetate, butyl acetate, etc.; aliphatic or alicyclic hydrocarbons such as hexane, cyclohexane, heptane, methyl cyclohexane, etc.; halogenated alkanes such as 1,2-dichloroethane, etc.; ketones such as methyl ethyl ketone, acetyl acetone, etc.; and the like. While not particularly limited, it is usually suitable that the solvent-based PSA composition is prepared to have a solid content (NV) of 5 to 30% by mass (e.g., 10 to 25% by mass). Too low an NV tends to result in higher production costs while too high a NV may lower the handling properties such as the ease of application, etc.

The PSA in the art disclosed herein has a viscosity at 30° C. of preferably 10 mPa·s or lower, more preferably 5 mPa·s or lower, or even more preferably 1.5 mPa·s or lower when measured with a toluene solution containing 10% by mass of the PSA. Such a PSA has a low solution viscosity for its solid content (NV), thereby providing good handling properties. This is preferable from the standpoint of increasing the productivity of the paint film protection sheet and reducing the solvent usage, etc. While the lower limit of the viscosity is not particularly limited, it is usually preferable to be 0.2 mPa·s or higher (e.g., 0.4 mPa·s or higher). It is noted that while the solution viscosity of the PSA is specified herein based on its 10% by mass toluene solution, the NV of the PSA composition used during the paint film protection sheet fabrication (particularly during the PSA layer formation) is not limited to 10% by mass, and the PSA may have a suitable NV (e.g., 5 to 30% by mass, preferably 10 to 25% by mass) in consideration of the coating consistency and the productivity, etc.

The thickness of the PSA layer is not particularly limited, and can be suitably selected according to the purpose. In usual, it is suitably about 100 µm or smaller (e.g., 2 µm to 100 µm), preferably about 3 µm to 30 µm, or more preferably about 4 µm to 20 µm. For instance, the above-described ranges of the PSA layer thickness can be preferably employed for a thickness of a PSA layer constituting a paint-film protection sheet for automobile.

The art disclosed herein can be particularly preferably practiced in an embodiment that a paint film protection sheet comprises a PSA layer having a thickness below 10 µm. In general, a smaller thickness of a PSA layer tends to give an adhesive strength smaller, and likely makes an entire PSA layer integrated and so on, and thus, in such case, it may be considered that an event (adhesive transfer) that the PSA layer is left on the paint film is not likely to occur. However, according to the present inventors' review, were observed phenomenon that in a paint film protection sheet comprising a non-crosslinked rubber-based polymer as a base polymer, the constitution in which a PSA layer has a thickness below 10 µm (e.g., 8 µm or less) tends to give more adhesive transfer generation rather than in case where a PSA layer has a thickness of 10 µm or more (e.g., approximately 10 µm to 15 µm). This may be because displacement in the PSA layer occurs due to a rapid deformation of the base polymer being non-crosslinked when peeling off the paint film protection sheet, thereby a part of the PSA cannot follow the entire movement, and is likely to be left on a surface of the paint film.

According to the art disclosed herein, even in a paint film protection sheet having a PSA layer of less than 10 µm thickness, great non-contaminating properties as well as great initial adhesiveness can be combined with high adhesive transfer resistance. Even in a paint film protection sheet comprising a non-crosslinked rubber-based polymer as a base polymer, when a PSA layer has a thickness less than 2 µm, an effect of the smaller adhesive strength becomes larger than that of the adhesive transfer due to the displacement, and therefore the adhesive transfer is not likely to occur. Therefore, it is particularly meaningful that the art disclosed herein can be applied to a paint film protection sheet comprising a PSA layer having a thickness of 2 µm or larger, but smaller than 10 µm (typically 3 µm or larger, but 8 µm or smaller, e.g., 4 µm or larger, but 6 µm or smaller). As a thickness of a PSA layer, can be used an arithmetic average value of thickness values measured at 5 different locations. For example, the overall thickness of a paint film protection sheet comprising a PSA layer and a support substrate is measured at five different locations and then the overall thickness of the paint film protection sheet after removal of the PSA layer is measured at five different locations; and the thickness of the PSA layer can be determined as a difference of the thickness measurement results. As a method for removing a PSA layer from a paint film protection sheet, can be suitably employed a method where the PSA layer is dissolved in a suitable organic solvent such as toluene, etc., a method where the PSA layer is swollen with an organic solvent and scraped off, or the like. To measure the thickness, for instance, a 1/10000 dial gauge can be used preferably.

According to a preferable embodiment, the art disclosed herein provides a paint film protection sheet that satisfies the following property (A): in a constant load peel test where a steel plate coated with an acid-epoxy crosslinked acrylic paint is used as an adherend, the paint film protection sheet of 25 mm width is pressure-bonded to the adherend, and after a lapse of 5 minutes, a 100 g load is applied so as to obtain a peel angle of 90° (more particularly, the test can be carried out based on the constant load peel test described later in Reference example 1), the paint film protection sheet exhibits a holding time of 200 seconds or more when measured from the time of the load application to the time at which 5 cm of the sheet has been peeled. A long holding time indicates great peel properties under a constant load and high initial adhesiveness. With the paint film protection sheet according to a more preferable embodiment, the holding time is 300 seconds or more (even more preferably 600 seconds or more, e.g., 900 seconds or more).

According to another preferable embodiment, the art disclosed herein provides a paint film protection sheet that satisfies the following property (B): in an adhesive transfer resistance test carried out based on the contents of Reference example 1 described later, the paint film protection sheet yields a surface area having adhesive transfers smaller than 30% (more preferably smaller than 20%, or even more preferably smaller than 10%). For example, it can provide a paint film protection sheet that satisfies the property (A) and the property (B) at the same time.

According to another embodiment, the art disclosed herein provides a paint film protection sheet that satisfies the following property (C): after stored either at 23° C. for 48 hours or at 70° C. for 48 hours, the paint film protection sheet exhibits a peel strength of 6.0 N/25 mm or lower (more preferably 5.0 N/25 mm or lower, e.g., 4.5 N/25 mm or lower), but 0.3 N/25 mm or greater (preferably 0.5 N/25 mm or greater, more preferably 1.0 N/25 mm or greater, even more preferably 2.0 n/25 mm or greater, e.g., 3.0 N/25 mm or greater) when measured based on the contents of Reference example 1 described later. For instance, it may provide a paint film protection sheet that satisfies the property (A) and the property (C) at the same time. A particularly preferable paint film protection sheet satisfies the properties (A), (B) and (C) at the same time.

EXAMPLES

Several worked examples relating to the present invention are described below, but the present invention is not intended to be limited to these examples. In the description below, "parts" and "%" are based on the mass unless otherwise specified.

Reference Example 1

Fabrication of Sample 1-1

A substrate-molding material mixture containing 70 parts of a homopolypropylene (trade name "NOVATEC PP FY4"

available from Japan Polypropylene Corporation), 20 parts of a LLDPE (trade name "KERNEL KF380" available from Japan Polyethylene Corporation) and 10 parts of rutile titanium(IV) oxide (trade name "TIPAQUE CR-95" available from Ishihara Sangyo Kaisha, Ltd.) was melted and compounded in a film-forming device, and the resultant was extruded from the T-die thereof to form a PP resin film of 40 μm thickness. To the back face (opposite to the face to be provided with a PSA layer) of this substrate, was applied a long-alkyl-based release agent to form a coating of about 0.05 μm thickness after dried as a release treatment. The support substrate was thus obtained.

In toluene, were dissolved 100 parts of an isobutylene-based polymer as a base polymer, 0.2 part of trade name "DUREZ 19900" (p-tert-octylphenol resin, Mw 1300, SP value 11.2, softening point 90° C.) available from Sumitomo Durez Co., Ltd., as a tackifier resin, 0.5 part of trade name "TINUVIN 326" (a benozotriazole-based UV-absorbing agent) available from BASF Corporation as a UV-absorbing agent, 0.02 part of trade name "CHIMASSORB 9444FDL" (a hindered amine-based photo-stabilizing agent) available from Nihon Ciba-Geigy K. K. as a photo-stabilizing agent and 0.25 part of trade name "IRGANOX 1010" (a hindered phenol-based antioxidant) available from Nihon Ciba-Geigy K. K. as an antioxidant to prepare a PSA solution of 12% NV. As the isobutylene-based polymer, were used two species under trade name "OPPANOL B-80" (Mw about 90×10$^4$, Mn about 25×10$^4$, Mw/Mn about 3.6) and trade name "OPPANOL B-12SFN" (Mw about 7×10$^4$, Mn about 2.6×10$^4$, Mw/Mn about 2.7) both available from BASF Corporation at a mass ratio of 85:15.

The PSA solution was applied to the front face (a surface without a release treatment) of the support substrate and allowed to dry to form a PSA layer of 5 μm thickness. A PSA sheet sample 1-1 was thus fabricated.

It is noted that due to the composition of the PSA solution, the PSA constituting the PSA layer in the Sample 1-1 contained 0.2 part of a low softening point tackifier resin ($T_L$) (corresponding also to a low softening point/high SP value tackifier resin ($T_{hsL}$)) relative to 100 parts of the base polymer, but free of a high softening point tackifier resin ($T_H$).

Fabrication of Sample 1-2

As the tackifier resin used in the fabrication of Sample 1-1, in addition to 0.2 part of "DUREZ 19900", was used 0.5 part of trade name "SUPER ESTER A-18" (a liquid rosin ester, AV 15 to 30 mgKOH/g) available from Arakawa Chemical Industries, Ltd. Otherwise in the same manner as the fabrication of Sample 1-1, Sample 1-2 was fabricated.

The PSA constituting the PSA layer in the Sample 1-2 contained 0.7 part of a low softening point tackifier resin ($T_L$) relative to 100 parts of the base polymer, but free of a high softening point tackifier resin ($T_H$).

Fabrication of Sample 1-3 to Sample 1-8

As the tackifier resin used in the fabrication of Sample 1-2, in place of 0.5 part of "SUPER ESTER A-18", were used 0.5 part each of trade name "SUPER ESTER A-75" (a rosin ester with softening point approximately 75° C., AV 10 mgKOH/g) for Sample 1-3, trade name "SUPER ESTER A-100" (a rosin ester with softening point approximately 100° C., AV 10 mgKOH/g) for Sample 1-4, trade name "SUPER ESTER A-115" (a rosin ester with softening point approximately 115° C., AV 20 mgKOH/g) for Sample 1-5, trade name "SUPER ESTER A-125" (a rosin ester with softening point approximately 125° C., AV 20 mgKOH/g) for Sample 1-6, trade name "PENSEL D-135" (a polymerized rosin ester with softening point approximately 135° C., AV 13 mgKOH/g) for Sample 1-7, and trade name "PENSEL D-160" (a polymerized rosin ester with softening point approximately 160° C., AV 13 mg/KOH/g) for Sample 1-8, with all being available from Arakawa Chemical Industries, Ltd. Otherwise in the same manner as the fabrication of Sample 1-2, Sample 1-3 to Sample 1-8 were fabricated.

It is noted that the PSA constituting the PSA layer in Sample 1-8 contained 0.5 part of a high softening point tackifier resin ($T_H$) as well as 0.2 part of a low softening point/high SP value tackifier resin ($T_L$) (also $T_{hsL}$). Thus, the values of mass ratios ($T_L/T_H$) and ($T_{hsL}/T_H$) of this PSA were both 0.4. The combined amount of tackifier resins contained (i.e., the total of the $T_H$ and $T_L$ contents) in the PSA was 0.7 part relative to 100 parts of the base polymer.

Fabrication of Sample 1-9, Sample 1-10

The usage of "PENSEL D-160" in the fabrication of Sample 1-8 was modified to 0.3 part for Sample 1-9 and 0.15 part for Sample 1-10. Otherwise in the same manner as the fabrication of Sample 1-8, Sample 1-9 and Sample 1-10 were fabricated.

The resulting PSA sheet samples 1-1 to 1-10 were subjected to the following evaluation tests. Their results are shown in Table 1 and Table 2 along with summarized specifications of the PSA according to each example.

[Constant Load Peel Test]

The PSA sheet sample according to each example was cut to a 25 mm wide by 150 mm long strip to prepare a test piece. In an environment at 23° C. and 50% RH, a painted plate was degreased with petroleum benzine, with the adherend having been prepared by coating a steel plate with an acid-epoxy crosslinked acrylic paint (trade name "KINO 1210TW" available from Kansai Paint Co., Ltd.). As shown in FIG. 2, to a first face of the painted plate (adherend) 56, an adhesive face (a surface of PSA layer 5) 5B of a test piece 54 was adhered. The adhesion was carried out by pressure-boding the test piece by moving a 2 kg rubber roller specified in JIS Z 0237:2000 back and forth once at a rate of 3 m/min. After a lapse of 5 minutes from the pressure-bonding, the painted plate 56 was held horizontally with the surface having the test piece 54 facing down, and a 100 g load 58 was applied to a first edge 52 of the test piece so that the test piece 54 would be peeled at 90° angle. The holding time (seconds) spent by the test piece 54 after the application of the load 58 until 5 cm thereof was peeled off was measured. A longer holding time indicates that it has greater peel properties under a constant load and greater initial adhesiveness. It is noted that in FIG. 2, reference numeral 5A shows a second face of the PSA layer 5, which is on the support substrate side.

[Non-Contaminating Property Test]

The PSA sheet sample according to each example was cut to a 25 mm wide strip to prepare a test piece. In a standard environment at 23° C. and 50% RH, a painted steel adherend was wiped lightly with dry cloth and the test piece was adhered thereto, with the painted plate (adherend) having been prepared by coating a steel plate with an acid-epoxy crosslinked acrylic paint (trade name "KING 1210TW" available from Kansai Paint Co., Ltd.). The adhesion was carried out by pressure-boding the test piece by moving a 2 kg rubber roller specified in JIS Z 0237:2000 back and forth once at a rate of 3 m/min. The test piece was stored under the standard environment for 7 days. Subsequently, in the same environment, a test operator peeled the test piece away from the painted plate (adherend) by hand at a peel angle of about 90° and a peel rate of 100 mm/min. After this, it was evaluated by visual inspections as described below (after 7 days at 23° C.).

Another test piece adhered in the same manner to a paint plate coated with the acid-epoxy crosslinked acrylic paint was stored in a dry oven at 70° C. for 7 days. The test piece was then removed from the oven and left in the standard environment for over 2 hours. Following this, in the same standard environment, a test operator peeled the test piece away from the paint plate by hand at a peel angle of about 90° and a peel rate of 100 mm/min. After this, it was evaluated by visual inspections as described below (after 7 days at 70° C.).

The surface of paint film after removal of the test piece was visually inspected, and the degree of cloudy contamination (the degree of cloudiness) of the surface of paint film was evaluated and assigned points ranging from 1 point (poor non-contaminating properties) to 4 points (no contamination found) with increments of 0.5. Thus, in this evaluation, a score of 2.5 points indicates a level of contamination that is minute and raises no practical issues (i.e., an acceptable level).

The degree of paint film contamination by the non-contaminating property test can also be evaluated by measuring with a suitable system the paint film color prior to the adhesion of the PSA sheet sample and the paint film color after the PSA sheet sample was removed, and detecting any difference in the paint film color (e.g., a difference in the lightness L) between the two.

The measurement can be carried out, using a multi-angle spectrophotometer under trade name "MA68II" available from X-Rite, Inc., with illuminant D65 at an observer angle of 10° with respect to acceptance angles of 15°, 25°, 45°, 75° and 110°. A score of 2.5 points based on the evaluation by visual inspections as described above corresponds approximately to a difference in the L value at 15° acceptance angle of 3.5 or greater, but less than 5.0. When the difference in the L value is 5.0 or greater, the score by visual evaluation generally turns out to be 2.0 points or lower. When the difference in the L value is less than 3.5, the score by visual evaluation is generally 3.0 points or higher.

[Peel Strength Measurement]

Peel strength was measured based on JIS Z 0237 (2000). In particular, PSA sheet sample of each example was cut to a 25 mm wide strip to prepare a test piece. In a standard environment at 23° C. and 50% RH, a painted steel plate was degreased with petroleum benzine and the test piece was adhered thereto, with the paint plate having been prepared by coating a steel plate with an acid-epoxy crosslinked acrylic paint (trade name "KINO 1210TW" available from Kansai Paint Co., Ltd.). The adhesion was carried out by pressure-boding the test piece by moving a 2 kg rubber roller specified in JIS Z 0237:2000 back and forth once at a rate of 3 m/min. The test piece was stored in the standard environment (23° C.) for 48 hours. Subsequently, in the same environment, using a tensile tester, the peel strength (N/25 mm) (after 48 hours at 23° C.) was measured at a peeling speed (cross head speed) of 30 m/min and a peel angle of 180°.

Another test piece adhered in the same manner to a paint plate coated with an acid-epoxy crosslinked acrylic paint was stored in a dry oven at 70° C. for 48 hours. The test piece was then removed from the oven and left in the standard environment for over 2 hours. Following this, similarly to the above, in the standard environment, the peel strength (N/25 mm) (after 48 hours at 70° C.) was measured at a peeling speed (cross head speed) of 30 m/min and a peel angle of 180°.

The measurement was repeated three times. Tables 1-6 show their arithmetic average values.

[Adhesive Transfer Resistance Test]

For deliberately creating a surface highly susceptible to adhesive transfers, the surface of paint film prepared by coating a 45 cm by 30 cm steel plate with an alkyd-melamine-based paint (trade name "TM13RC" available from Kansai Paint Co., Ltd.) was polished with a polishing agent (trade name "HARD 5982-1-L" available from Sumitomo 3M Ltd.) at 1500 rpm across from north to south and east to west for 5 minutes, using an electric polisher (model number "PV7001C" available from Makita Corporation) equipped with a wool buff (trade name "959-721" available from Hitachi Koki Co., Ltd.). The polishing agent was subsequently removed from the surface using a finishing cotton flannel cloth, and the polished plate was used as the adherend. These procedures were carried out in a standard environment at 23° C. and 50% RH.

PSA sheet sample of each example was cut to a 50 mm wide strip to prepare a test piece. The test piece was pressure-bonded to the adherend and the resultant was stored in the standard environment for 4 days. Subsequently, it was stored in an environment at −5° C. with higher likelihood to cause adhesive transfers for one hour, and in the same environment, a test operator peeled the test piece away from the adherend by hand at a peel angle of about 90° and a peeling speed of about 100 mm/min. The surface of paint film after the peeling was visually inspected, and the percentage (%) of the area of the paint film with remaining PSA layer to the area over which the PSA sheet had been adhered was determined.

TABLE 1

| | | Sample | | | | |
|---|---|---|---|---|---|---|
| | | 1-1 | 1-2 | 1-3 | 1-4 | 1-5 |
| Thickness of PSA layer (μm) | | 5 | 5 | 5 | 5 | 5 |
| Base polymer | Oppanol B12SFN (parts) | 15 | 15 | 15 | 15 | 15 |
| | Oppanol B80 (parts) | 85 | 85 | 85 | 85 | 85 |
| Tackifier resin | Durez19900 ($T_L$) (parts) | 0.2 | 0.2 | 0.2 | 0.2 | 0.2 |
| | Rosin ester | | | | | |
| | type | none | A-18 | A-75 | A-100 | A-115 |
| | softening point (° C.) | — | liquid | 75 | 100 | 115 |
| | acid value (mgKOH/g) | — | 15-30 | 10 | 10 | 20 |
| | amount (parts) | none | 0.5 | 0.5 | 0.5 | 0.5 |

TABLE 1-continued

|  |  | Sample | | | | |
|---|---|---|---|---|---|---|
|  |  | 1-1 | 1-2 | 1-3 | 1-4 | 1-5 |
| Constant load peel test | Holding time (seconds) | 150 | 629 | 461 | 627 | 337 |
| Non-contaminating properties | After 7 days at 23° C. | 2.5 | 2.0 | 2.0 | 2.0 | 2.0 |
|  | After 7 days at 70° C. | 3.5 | 3.5 | 3.5 | 3.5 | 3.5 |
| Peel strength 30 m/min | After 48 h at 23° C. (N/25 mm) | 1.5 | 1.8 | 2.5 | 3.2 | 3.5 |
|  | After 48 h at 70° C. (N/25 mm) | 1.2 | 1.2 | 1.1 | 1.6 | 1.5 |
| Adhesive transfer preventability | Area with adhesive transfers (%) | 0 | 2 | 2 | 40 | 25 |

TABLE 2

|  |  | Sample | | | | |
|---|---|---|---|---|---|---|
|  |  | 1-6 | 1-7 | 1-8 | 1-9 | 1-10 |
|  | Thickness of PSA layer (μm) | 5 | 5 | 5 | 5 | 5 |
| Base polymer | Oppanol B12SFN (parts) | 15 | 15 | 15 | 15 | 15 |
|  | Oppanol B80 (parts) | 85 | 85 | 85 | 85 | 85 |
| Tackifier resin | Durez19900 ($T_L$) (parts) | 0.2 | 0.2 | 0.2 | 0.2 | 0.2 |
|  | Rosin ester |  |  |  |  |  |
|  | type | A-125 | D-135 | D-160 | D-160 | D-160 |
|  | softening point (° C.) | 125 | 135 | 160 | 160 | 160 |
|  | acid value (mgKOH/g) | 20 | 13 | 13 | 13 | 13 |
|  | amount (parts) | 0.5 | 0.5 | 0.5 | 0.3 | 0.15 |
| Constant load peel test | Holding time (seconds) | 1012 | 1154 | 2727 | 1024 | 300 |
| Non-contaminating properties | After 7 days at 23° C. | 2.5 | 2.5 | 3.0 | 2.5 | 3.0 |
|  | After 7 days at 70° C. | 3.0 | 3.0 | 2.5 | 3.5 | 3.5 |
| Peel strength 30 m/min | After 48 h at 23° C. (N/25 mm) | 5.6 | 5.6 | 7.8 | 5.5 | 3.9 |
|  | After 48 h at 70° C. (N/25 mm) | 4.8 | 5.0 | 7.3 | 5.8 | 3.6 |
| Adhesive transfer preventability | Area with adhesive transfers (%) | 30 | 30 | 50 | 30 | 5 |

As shown in Table 1 and Table 2, with respect to Samples 1-6 to 1-10 each comprising 1.0 part or less (more specifically 0.15 part to 0.5 part) of a rosin ester having a softening point of 120° C. or above as a tackifier resin ($T_H$) relative to 100 parts of the base polymer (here, a polyisobutylene), all resulted in a holding time of 200 seconds or more (more specifically 300 seconds or more) in the constant load peel test, whereby the holding time was increased twofold or more as compared to Sample 1-1 free of a tackifier resin ($T_H$). All of Samples 1-6 to 1-10 exhibited acceptable levels (2.5 points or higher) of non-contaminating properties at both 23° C. and 70° C. As such, with Samples 1-6 to 1-10, without significantly impairing the non-contaminating properties of Sample 1-1, the initial adhesiveness was greatly increased. In particular, Sample 1-10 exhibited superior non-contaminating properties and adhesive transfer resistance.

On the contrary, with respect to Samples 1-2 to 1-5 each using a rosin ester having a softening point below 120° C., but no tackifier resin ($T_H$), none of them was able to combine initial adhesiveness exhibiting a holding time of 200 seconds or more in the constant load peel test and acceptable levels (2.5 points or higher) of non-contaminating properties, indicating a poor balance of properties as a paint film protection sheet Example Fabrication of Sample 2-1, Sample 2-2

In the fabrication of Sample 1-1, the amount of "DUREZ 19900" was modified to 0.3 part for Sample 2-1, and 0.4 part for Sample 2-2. Otherwise in the same manner as the fabrication of Sample 1-1, Samples 2-1 and 2-2 were fabricated.

Fabrication of Sample 2-3

In the fabrication of Sample 1-1, in place of 0.2 part of "DUREZ 19900", 0.3 part of "PENSEL D-160" was used. Otherwise in the same manner as the fabrication of Sample 1-1, Samples 2-3 was fabricated.

Fabrication of Sample 2-4 to Sample 2-7

As the tackifier resin used in the fabrication of Sample 1-1, were used "DUREZ 19900" and "PENSEL D-160" in amounts shown in Table 4, respectively. Otherwise in the same manner as the fabrication of Sample 1-1, Samples 2-4 to 2-7 were fabricated.

The resulting PSA sheet samples 2-1 to 2-7 were subjected to the constant load peel test, non-contaminating property test, peel strength measurement and adhesive transfer resistance test in the same manner as Reference example 1. Their results are shown in Table 3 and Table 4 along with summarized specifications of the PSA according to each example. In addition, the test results of Sample 1-1, Sample 1-9 and Sample 1-10 according to Reference example 1 are also shown.

TABLE 3

| | | Sample | | |
|---|---|---|---|---|
| | | 1-1 | 2-1 | 2-2 |
| Thickness of PSA layer (μm) | | 5 | 5 | 5 |
| Base polymer | Oppanol B12SFN (parts) | 15 | 15 | 15 |
| | Oppanol B80 (parts) | 85 | 85 | 85 |
| Tackifier resin | Durez19900 ($T_L$) (parts) | 0.2 | 0.3 | 0.4 |
| | D-160 ($T_H$) (parts) | — | — | — |
| | Mass ratio ($T_L/T_H$) | — | — | — |
| | $T_L + T_H$ (parts) | 0.2 | 0.3 | 0.4 |
| Constant load peel test | Holding time (seconds) | 150 | 190 | 365 |
| Non-contaminating properties | After 7 days at 23° C. | 2.5 | 2.5 | 2.0 |
| | After 7 days at 70° C. | 3.5 | 3.0 | 2.5 |
| Peel strength 30 m/min | After 48 h at 23° C. (N/25 mm) | 1.5 | 2.1 | 2.3 |
| | After 48 h at 7° C. (N/25 mm) | 1.2 | 1.9 | 2.2 |
| Adhesive transfer preventability | Area with adhesive transfers (%) | 0 | 5 | 10 |

TABLE 4

| | | Sample | | | | | | |
|---|---|---|---|---|---|---|---|---|
| | | 2-3 | 1-9 | 1-10 | 2-4 | 2-5 | 2-6 | 2-7 |
| Thickness of PSA layer (μm) | | 5 | 5 | 5 | 5 | 5 | 5 | 5 |
| Base polymer | Oppanol B12SFN (parts) | 15 | 15 | 15 | 15 | 15 | 15 | 15 |
| | Oppanol B80 (parts) | 85 | 85 | 85 | 85 | 85 | 85 | 85 |
| Tackifier resin | Durez19900 ($T_L$) (parts) | — | 0.2 | 0.2 | 0.25 | 0.3 | 0.35 | 0.3 |
| | D-160 ($T_H$) (parts) | 0.3 | 0.3 | 0.15 | 0.15 | 0.15 | 0.15 | 0.1 |
| | Mass ratio ($T_L/T_H$) | — | 0.67 | 1.33 | 1.66 | 2.0 | 2.33 | 3.0 |
| | $T_L + T_H$ (parts) | 0.3 | 0.5 | 0.35 | 0.4 | 0.45 | 0.5 | 0.4 |
| Constant load peel test | Holding time (seconds) | 460 | 1024 | 300 | 261 | 379 | 534 | 297 |
| Non-contaminating properties | After 7 days at 23° C. | 3.5 | 2.5 | 3.0 | 3.0 | 3.0 | 2.5 | 3.0 |
| | After 7 days at 70° C. | 3.0 | 3.5 | 3.5 | 3.0 | 3.0 | 3.0 | 3.0 |
| Peel strength 30 m/min | After 48 h at 23° C. (N/25 mm) | 5.6 | 5.5 | 3.9 | 5.2 | 5.4 | 4.1 | 3.1 |
| | After 48 h at 70° C. (N/25 mm) | 5.5 | 5.8 | 3.6 | 4.4 | 4.3 | 3.9 | 2.4 |
| Adhesive transfer preventability | Area with adhesive transfers (%) | 40 | 30 | 5 | 5 | 0 | 15 | 5 |

As shown in Table 3, Samples 2-1 and 2-2 each containing a tackifier resin having a softening point below 120° C. in an amount larger than in Sample 1-1, but using no tackifier resin ($T_H$) was not able to combine initial adhesiveness exhibiting a holding time of 200 seconds or more in the constant load peel test and acceptable levels (2.5 points or higher) of non-contaminating properties.

As shown in Table 4, Sample 1-10 and Samples 2-4 to 2-7 each containing a tackifier resin having the mass ratio ($T_L/T_H$) of 1.0 or more, wherein the mass ratio ($T_L/T_H$), is the mass ratio of the tackifier resin ($T_L$) content relative to the tackifier resin ($T_H$) content, exhibited excellent adhesive transfer resistance as compared to Sample 1-9 being the mass ratio ($T_L/T_H$) below 1.0.

Reference Example 2

Fabrication of Sample 3-1 to Sample 3-3

In place of 0.5 part of "SUPER ESTER A-18" used in the fabrication of Sample 1-2, was used trade name "PENSEL D-125" (a polymerized rosin ester with softening point approximately 125° C., AV 13 mgKOH/g) available from Arakawa Chemical Industries, Ltd., in amounts of 1.2 parts for Sample 3-1, 2.0 parts for Sample 3-2 and 5.0 parts for Sample 3-3. Otherwise in the same manner as the fabrication of Sample 1-2, Sample 3-1 to Sample 3-3 were fabricated.

Fabrication of Sample 3-4 to Sample 3-6

In place of 0.5 part of "SUPER ESTER A-18" used in the fabrication of Sample 1-2, "PENSEL D-135" was used in amounts of 1.2 parts for Sample 3-4, 2.0 parts for Sample 3-5 and 5.0 parts for Sample 3-6. Otherwise in the same manner as the fabrication of Sample 1-2, Sample 3-4 to Sample 3-6 were fabricated.

Fabrication of Sample 3-7 to Sample 3-9

In place of 0.5 part of "SUPER ESTER A-18" used in the fabrication of Sample 1-2, "PENSEL D-160" was used in amounts of 1.2 parts for Sample 3-7, 2.0 parts for Sample 3-8 and 5.0 parts for Sample 3-9. Otherwise in the same manner as the fabrication of Sample 1-2, Sample 3-7 to Sample 3-9 were fabricated.

The resulting PSA sheet samples 3-1 to 3-9 were subjected to the constant load peel test, non-contaminating property test, peel strength measurement and adhesive transfer resistance test in the same manner as Reference example 1. Their results are shown in Table 5 and Table 6 along with summarized specifications of the PSA according to each example.

TABLE 5

|  |  | \multicolumn{6}{c}{Sample} |
| --- | --- | --- | --- | --- | --- | --- | --- |
|  |  | 3-1 | 3-2 | 3-3 | 3-4 | 3-5 | 3-6 |
| \multicolumn{2}{l}{Thickness of PSA layer (μm)} | 5 | 5 | 5 | 5 | 5 | 5 |
| Base polymer | Oppanol B12SFN (parts) | 15 | 15 | 15 | 15 | 15 | 15 |
|  | Oppanol B80 (parts) | 85 | 85 | 85 | 85 | 85 | 85 |
| Tackifier resin | Durez19900 ($T_L$) (parts) | 0.2 | 0.2 | 0.2 | 0.2 | 0.2 | 0.2 |
|  | Rosin ester |  |  |  |  |  |  |
|  | type | D-125 | D-125 | D-125 | D-135 | D-135 | D-135 |
|  | softening point (° C.) | 125 | 125 | 125 | 135 | 135 | 135 |
|  | amount (parts) | 1.2 | 2.0 | 5.0 | 1.2 | 2.0 | 5.0 |
| Constant load peel test | Holding time (seconds) | >10000 | >10000 | >10000 | 5000 | 5000 | >10000 |
| Non-contaminating properties | After 7 days at 23° C. | 1.5 | 1.5 | 1.5 | 2.5 | 3.0 | 2.5 |
|  | After 7 days at 70° C. | 2.5 | 2.0 | 1.0 | 2.0 | 1.5 | 1.0 |
| Peel strength 30 m/min | After 48 h at 23° C. (N/25 mm) | 6.0 | 6.8 | 5.0 | 8.8 | 7.5 | 7.4 |
|  | After 48 h at 70° C. (N/25 mm) | 6.5 | 5.8 | 3.2 | 6.9 | 5.1 | 2.3 |
| Adhesive transfer preventability | Area with adhesive transfers (%) | 80 | 60 | 20 | 80 | 70 | 50 |

TABLE 6

|  |  | \multicolumn{3}{c}{Sample} |
| --- | --- | --- | --- | --- |
|  |  | 3-7 | 3-8 | 3-9 |
| \multicolumn{2}{l}{Thickness of PSA layer (μm)} | 5 | 5 | 5 |
| Base polymer | Oppanol B12SFN (parts) | 15 | 15 | 15 |
|  | Oppanol B80 (parts) | 85 | 85 | 85 |
| Tackifier resin | Durez19900 ($T_L$) (parts) | 0.2 | 0.2 | 0.2 |
|  | Rosin ester |  |  |  |
|  | type | D-160 | D-160 | D-160 |
|  | softening point (° C.) | 160 | 160 | 160 |
|  | amount (parts) | 1.2 | 2.0 | 5.0 |
| Constant load peel test | Holding time (seconds) | 4688 | 3000 | >10000 |
| Non-contaminating properties | After 7 days at 23° C. | 2.5 | 3.0 | 3.0 |
|  | After 7 days at 70° C. | 3.0 | 2.0 | 1.5 |
| Peel strength 30 m/min | After 48 h at 23° C. (N/25 mm) | 11.0 | 10.0 | 4.9 |
|  | After 48 h at 70° C. (N/25 mm) | 7.8 | 4.6 | 2.7 |
| Adhesive transfer preventability | Area with adhesive transfers (%) | 90 | 80 | 10 |

As evident from Tables 5 and 6, with respect to Samples 3-1 to 3-9 each showing the mass ratio ($T_L/T_H$) below 1.0, wherein the mass ratio ($T_L/T_H$), is the mass ratio of the tackifier resin ($T_L$) content relative to the tackifier resin ($T_H$) content, all resulted in poor non-contaminating properties, excessively high peel strength, or excessively poor adhesive transfer resistance, etc., exhibiting poor properties as paint film protection sheets. In Samples 3-1 to 3-9, the total amount of the tackifier resins ($T_L$) and ($T_H$) is more than 1 part relative to 100 parts of the base polymer. This could be one of the reasons for resulting in excessively high peel strength, or excessively poor adhesive transfer residence.

Although specific embodiments of the present invention have been described in detail above, these are merely for illustrations and do not limit the scope of the claims. The art according to the claims includes various modifications and changes made to the specific embodiments illustrated above.

INDUSTRIAL APPLICABILITY

The paint film protection sheet according to the present invention is preferable when used in an embodiment where it is adhered to an adherend (an article to be protected) to serve a role to protect the surface of the adherend from damages and removed from the paint film after completed the protective role, with examples of the paint film including metal plates (steel plates, stainless steel plates, aluminum plates, etc.), painted metal plates having paint films on the surfaces (e.g., painted steel plates used for house building materials, other building materials, etc.), synthetic resin plates, articles molded from these, and so on. The paint protection sheet according to the present invention can be adhered to paint films of articles to be protected, which have been provided with paint works using paints of various compositions such as acrylic, polyester-based, alkyd-based, melamine-based, urethane-based, acid-epoxy crosslinked paints, or their composites (e.g., acrylic melamine-based, alkyd melamine-based paints, etc.) (with the articles to be protected being articles having paint films formed by the paint works, for example, automobile bodies, automotive components, metal plates such as steel plates and molded articles thereof, etc.), and used preferably as a means to protect the paint films from collisions with minute objects and contacts with chemicals, etc.

What is claimed is:

1. A paint film protection sheet comprising a support substrate and a pressure-sensitive adhesive layer placed on the support substrate, wherein
    the pressure-sensitive adhesive layer is constituted with a pressure-sensitive adhesive comprising a non-cross-linked rubber-based polymer as a base polymer, at least one tackifier resin ($T_H$) selected from the group consisting of rosin-based resins, terpene-based resins, petroleum resins, phenol resins, alkylphenol resins, xylene resins, alkyd resins, epoxy resins, and hydrogenation products thereof, and having a softening point of 120° C. or above, and a tackifier resin ($T_L$) having a softening point of 70° C. to below 120° C.,
    the mass ratio ($T_L/T_H$) of the tackifier resin ($T_L$) content relative to the tackifier resin ($T_H$) content has a value of 1.0 or larger and 30 or less, and
    the base polymer is at least one polymer selected from the group consisting of a homopolyisobutylene, a copolymer of isobutylene and normal butylene, and a copolymer of isobutylene and isoprene,
    wherein the tackifier resin ($T_L$) has an SP value of 8.5 or larger.

2. The paint film protection sheet according to claim 1, wherein the amount of the tackifier resin ($T_H$) is 0.05 parts by mass or greater relative to 100 parts by mass of the base polymer, the amount of the tackifier resin ($T_L$) is 0.05 parts by mass or greater relative to 100 parts by mass of the base polymer, and the total amount of the tackifier resin ($T_H$) and the tackifier resin ($T_L$) is 1.0 part by mass or less relative to 100 parts by mass of the base polymer.

3. The paint film protection sheet according to claim 2, wherein a softening point difference between the tackifier resin ($T_H$) and the tackifier resin ($T_L$) is 30° C. or more.

4. The paint film protection sheet according to claim 2, wherein the tackifier resin ($T_H$) is a rosin-based resin.

5. The paint film protection sheet according to claim 2, wherein the tackifier resin ($T_L$) has an SP value of 8.5 or larger.

6. The paint film protection sheet according to claim 2, wherein the pressure-sensitive adhesive layer has a thickness of 1 μm or larger, but smaller than 10 μm.

7. The paint film protection sheet according to claim 2 exhibiting a holding time of 200 seconds or more in a constant load peel test.

8. The paint film protection sheet according to claim 1, wherein a softening point difference between the tackifier resin ($T_H$) and the tackifier resin ($T_L$) is 30° C. or more.

9. The paint film protection sheet according to claim 8, wherein the tackifier resin ($T_H$) is a rosin-based resin.

10. The paint film protection sheet according to claim 8, wherein the tackifier resin ($T_L$) has an SP value of 8.5 or larger.

11. The paint film protection sheet according to claim 8, wherein the pressure-sensitive adhesive layer has a thickness of 1 μm or larger, but smaller than 10 μm.

12. The paint film protection sheet according to claim 8 exhibiting a holding time of 200 seconds or more in a constant load peel test.

13. The paint film protection sheet according to claim 1, wherein the tackifier resin ($T_H$) is a rosin-based resin.

14. The paint film protection sheet according to claim 1, wherein the pressure-sensitive adhesive layer has a thickness of 1 μm or larger, but smaller than 10 μm.

15. The paint film protection sheet according to claim 1 exhibiting a holding time of 200 seconds or more in a constant load peel test.

16. The paint film protection sheet according to claim 1, wherein a softening point difference between the tackifier resin (TH) and the tackifier resin (TL) is 30° C. or more.

17. The paint film protection sheet according to claim 1, wherein 70% by mass or greater of a polymeric component in the pressure-sensitive adhesive is an isobutylene-based polymer.

* * * * *